United States Patent [19]
Kunieda et al.

[11] Patent Number: 5,523,038
[45] Date of Patent: Jun. 4, 1996

[54] PROCESS AND AN APPARATUS FOR PRODUCING INSULATORS

[75] Inventors: Shigehiko Kunieda, Iwakura; Osamu Tsuji; Toshiro Marumasu, both of Nagoya, all of Japan

[73] Assignee: NGK Insulators, Ltd., Japan

[21] Appl. No.: 213,801

[22] Filed: Mar. 16, 1994

[30] Foreign Application Priority Data

Mar. 26, 1993 [JP] Japan ................................. 5-068280
Mar. 31, 1993 [JP] Japan ................................. 5-073926

[51] Int. Cl.$^6$ .................................................. B29C 43/18
[52] U.S. Cl. .............. 264/135; 156/244.18; 156/244.25; 174/179; 264/139; 264/149; 264/161; 264/297.5; 264/320; 425/116; 425/195; 425/297; 425/408
[58] Field of Search ................................ 174/179; 264/135, 264/139, 149, 275, 297.5, 320, 161; 425/90, 116, 305.1, 297, 195, 408; 156/244.18, 244.25

[56] References Cited

U.S. PATENT DOCUMENTS

| | | | |
|---|---|---|---|
| 2,435,567 | 2/1948 | Albanese | 264/325 |
| 4,312,123 | 1/1982 | Wheeler | 174/179 |
| 4,702,873 | 10/1987 | Kaczerginski | 264/135 |
| 4,724,284 | 2/1988 | Wheeler | 174/179 |
| 4,845,318 | 7/1989 | Clabburn et al. | 174/179 |
| 5,233,132 | 8/1993 | Soucille | 174/179 |

FOREIGN PATENT DOCUMENTS

| | | |
|---|---|---|
| 0065227 | 11/1982 | European Pat. Off. . |
| 2523361 | 9/1983 | France . |
| 2576655 | 8/1986 | France . |
| 1030862 | 7/1983 | U.S.S.R. ................. 174/179 |

OTHER PUBLICATIONS

Patent Abstracts of Japan, vol. 17, No. 593 (E-1454), Oct. 28, 1993 & JP-A-05 182 546 (Kunieda Shigehiko) Jul. 23, 1993.

Database WPI, Week 9336, Derwent Publications Ltd., London, GB; AN 93-285023 & JP-A-5 200 773 (NGK Insulators) Aug. 10, 1993.

*Primary Examiner*—Robert Davis
*Attorney, Agent, or Firm*—Parkhurst, Wendel & Burr

[57] ABSTRACT

A process for producing, by compression molding, an insulator having a core and a housing consisting of a sheath portion and at least one shade portion around the sheath portion, including the steps of: (A) preliminarily forming a rubbery layer around an outer periphery of the core to obtain a preliminarily molded body by extrusion molding, (B) placing the preliminarily molded body between at least two mold units of a mold; (C) forming a compressed molding by compression molding said preliminarily molded body in a given shape inside a cavity defined by the at least two mold units; and (D) curing the resulting molding. An apparatus is also disclosed for producing such an insulator by compression molding, which apparatus includes (A) a preliminary molding unit, (B) a molding unit form forming a compressed molding from the preliminarily molded body in a given shape by using a mold, and (C) a heater for curing the rubber in the rubber layer.

16 Claims, 19 Drawing Sheets

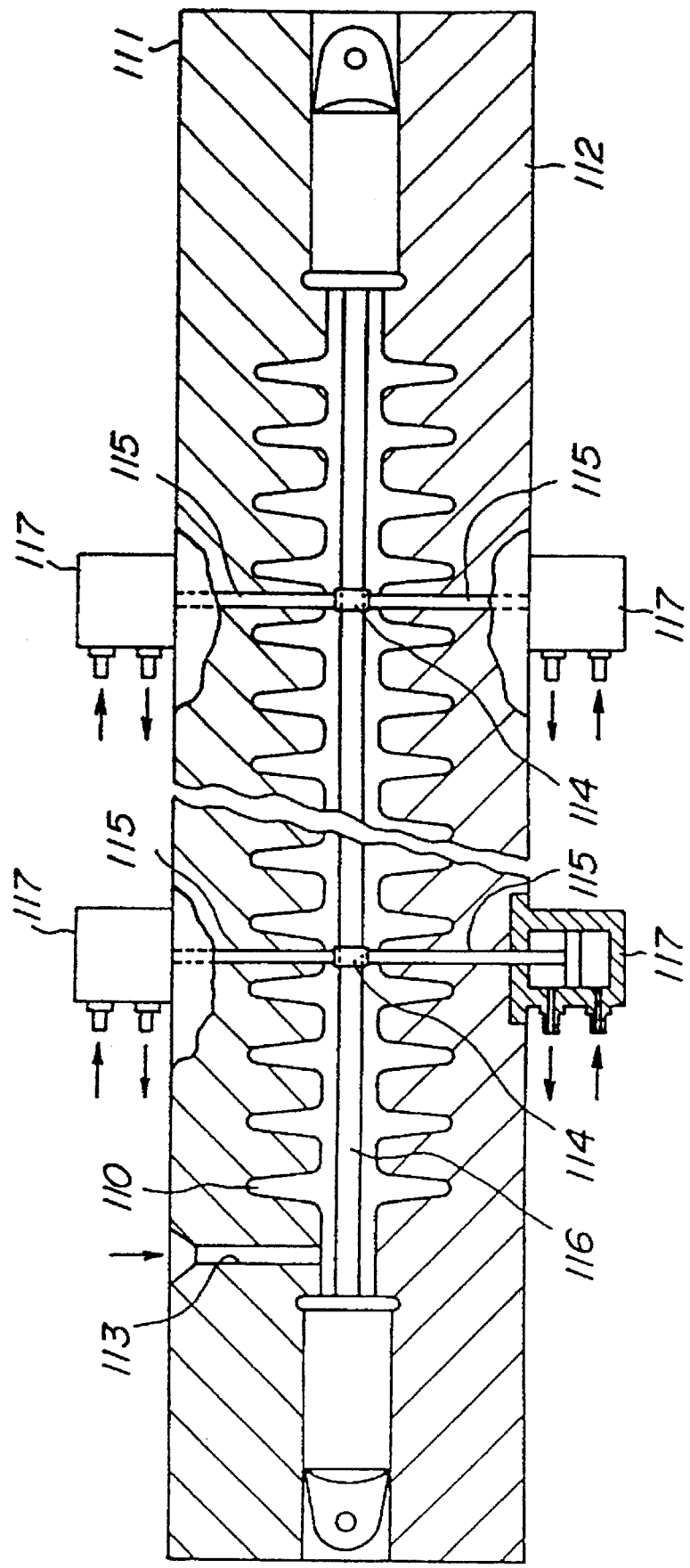
FIG_2 *PRIOR ART*

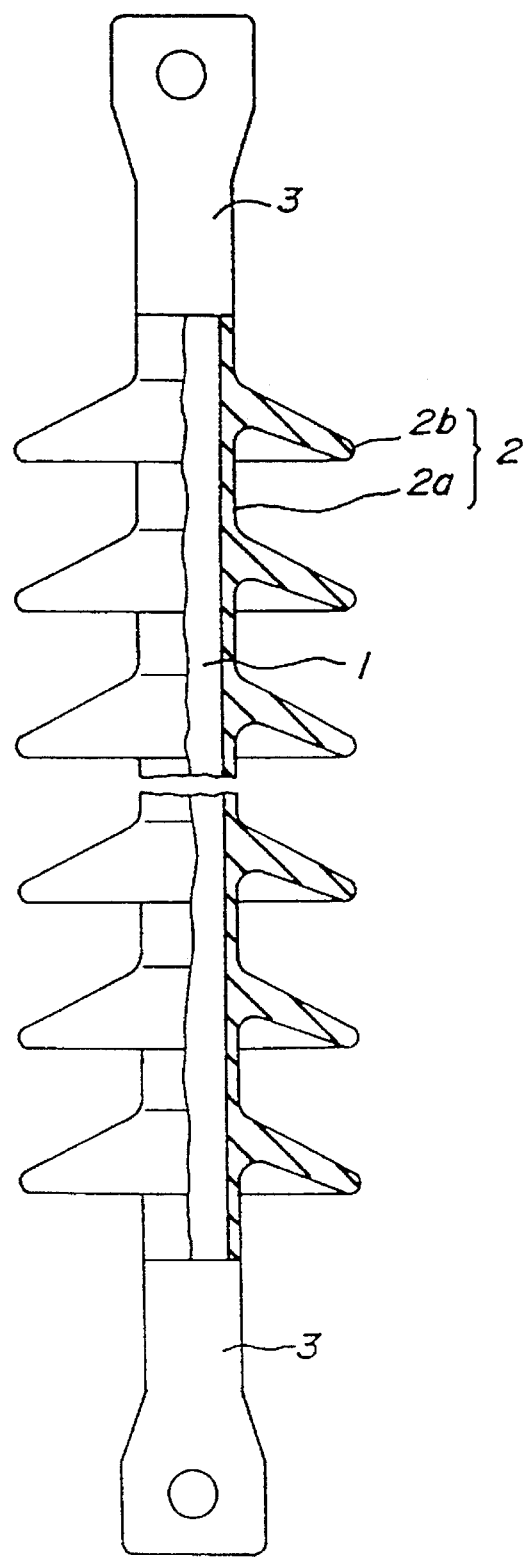
FIG_3a

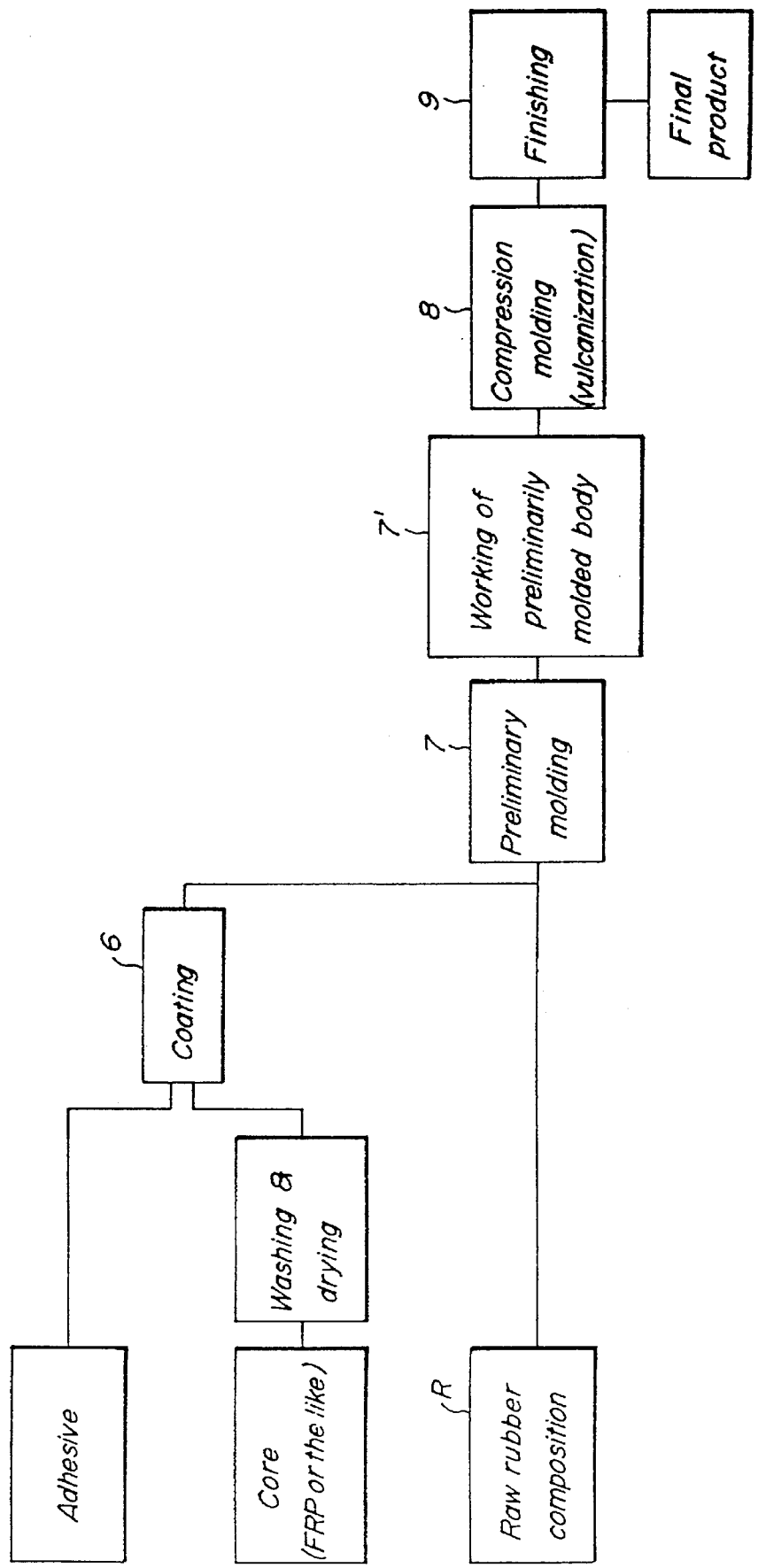

FIG_5
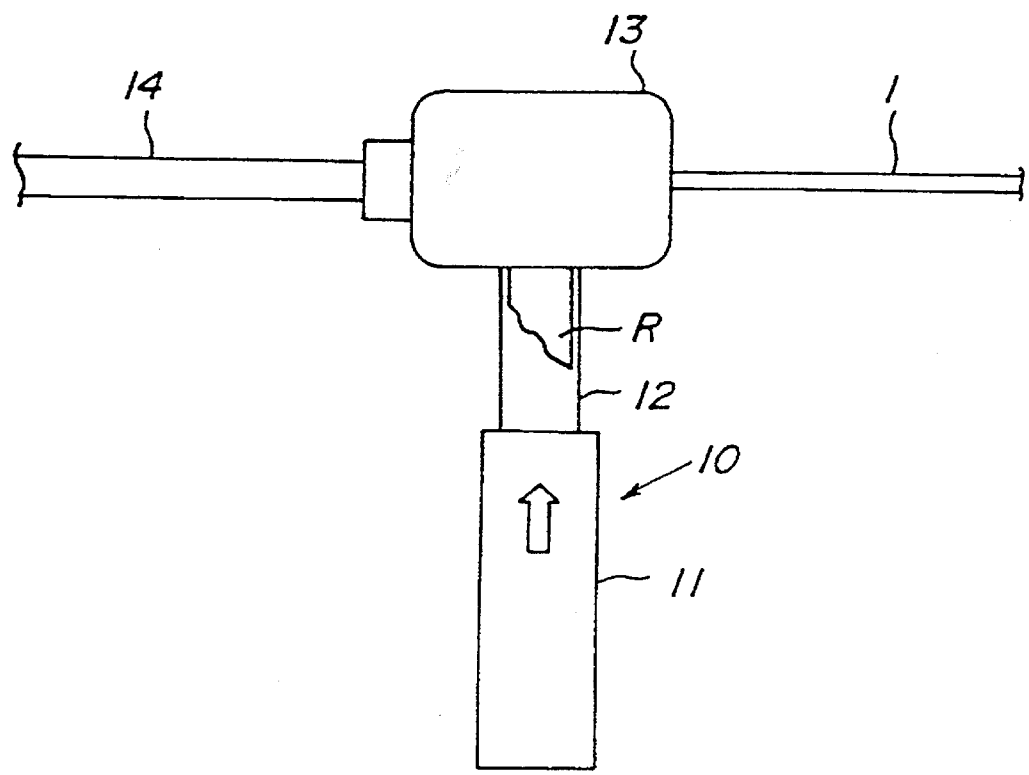
FIG_6
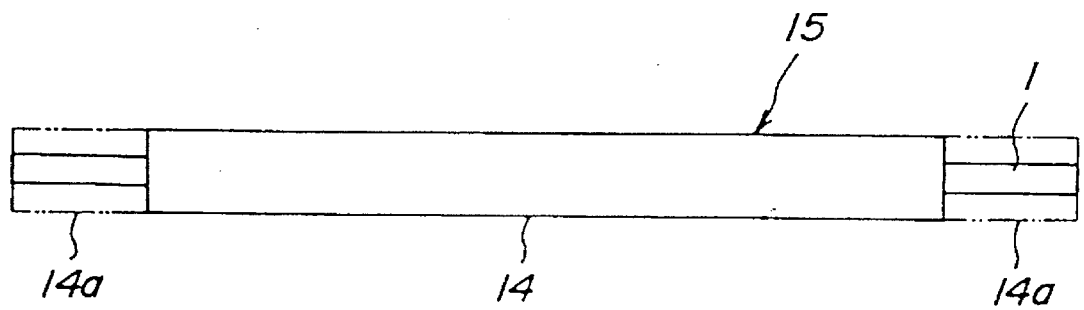

FIG_7
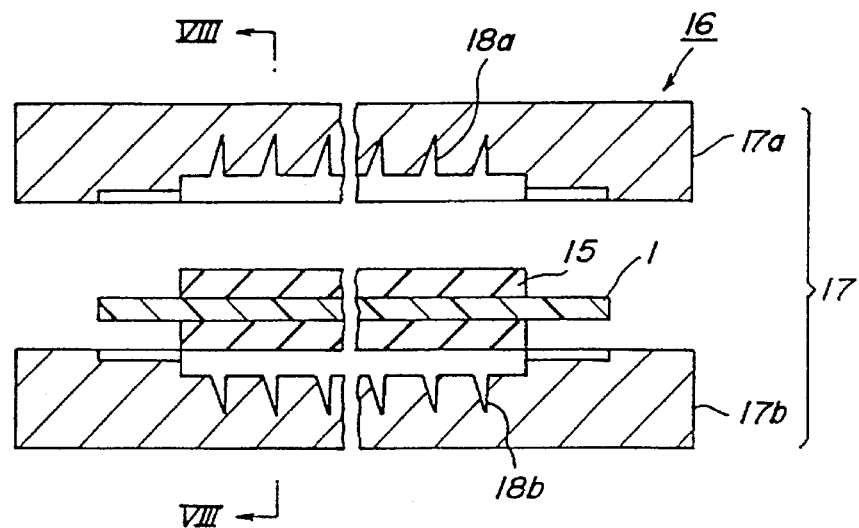
FIG_8
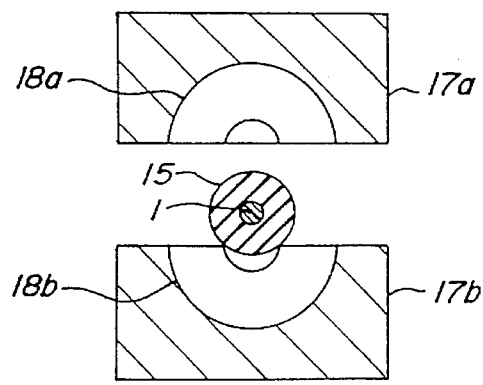
FIG_9
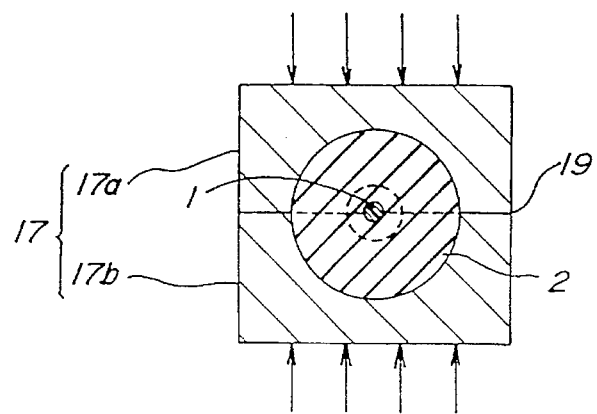

FIG_10
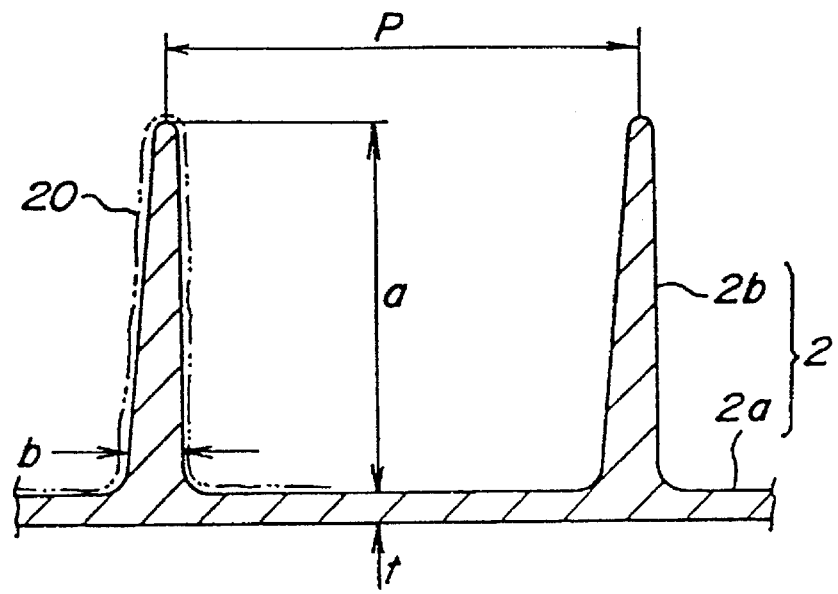
FIG_11
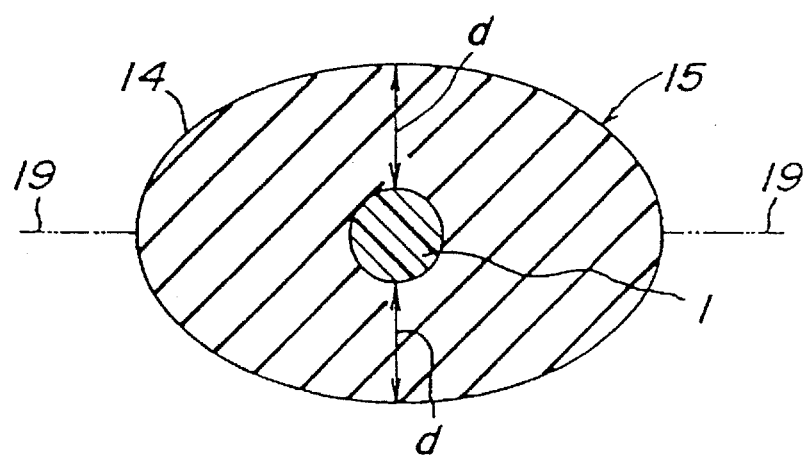

FIG_14a
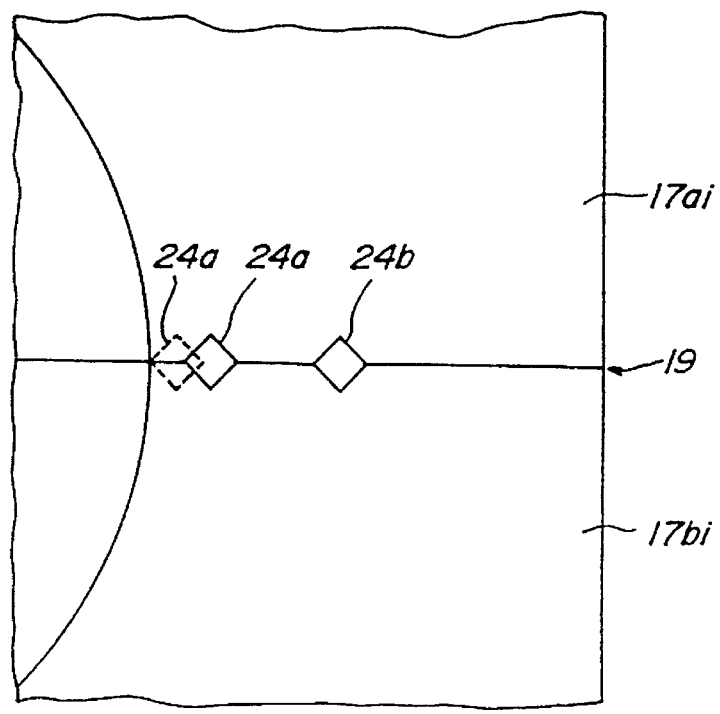
FIG_14b
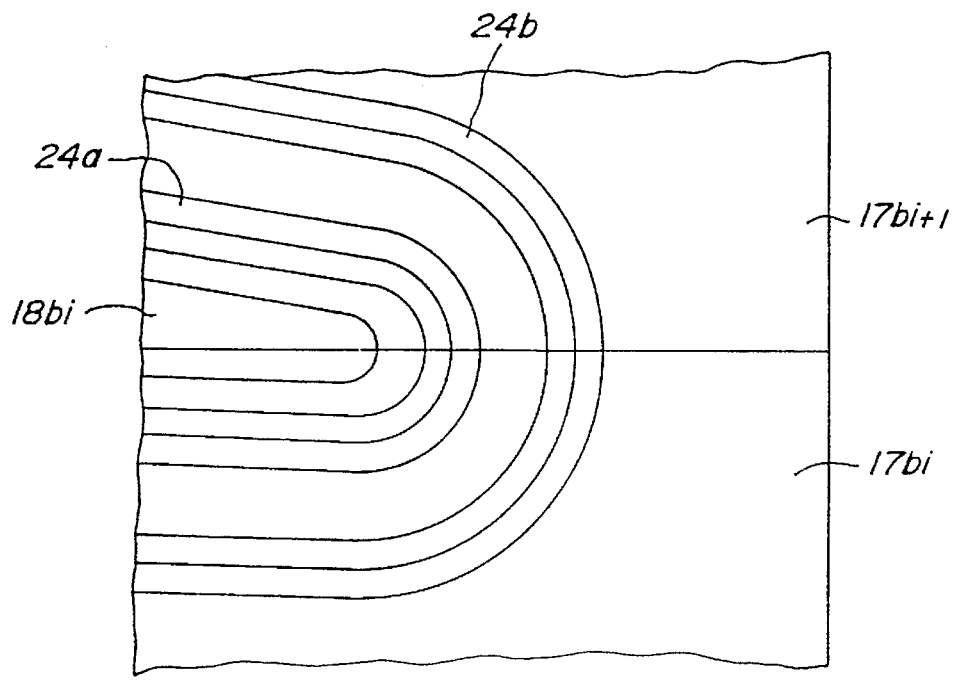

FIG_15a
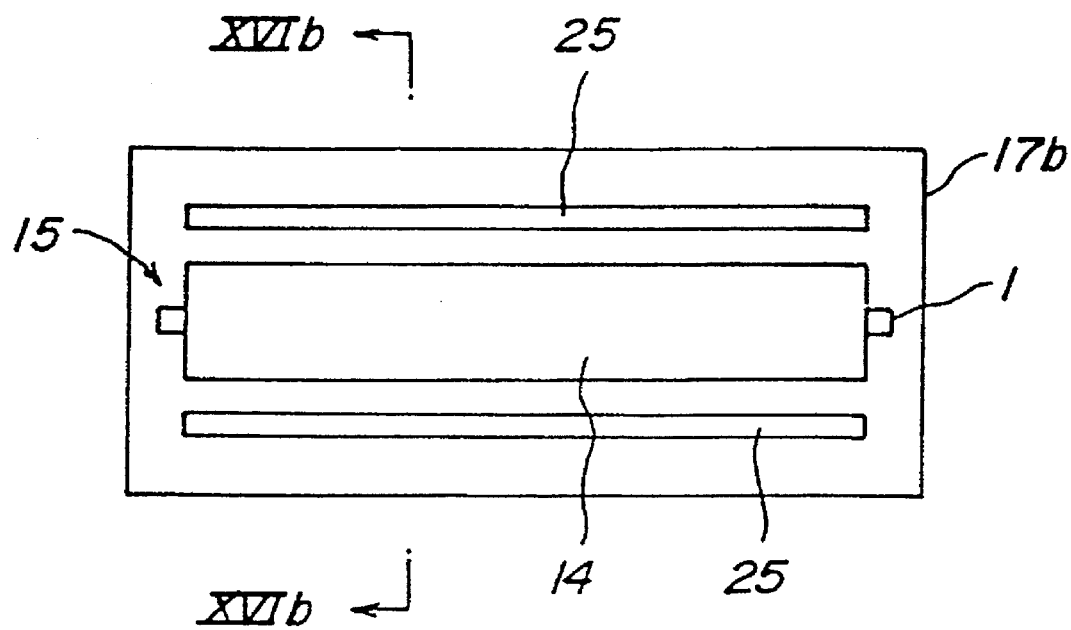
FIG_15b
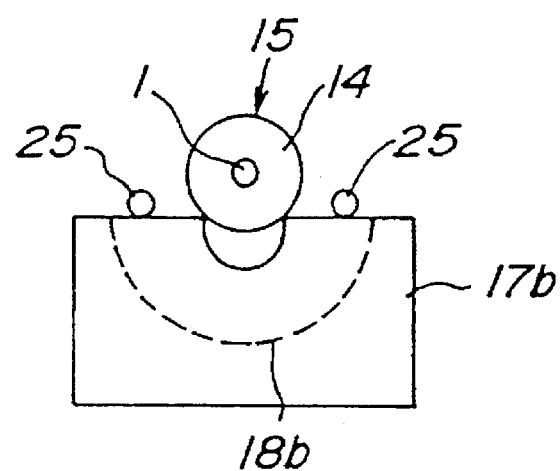

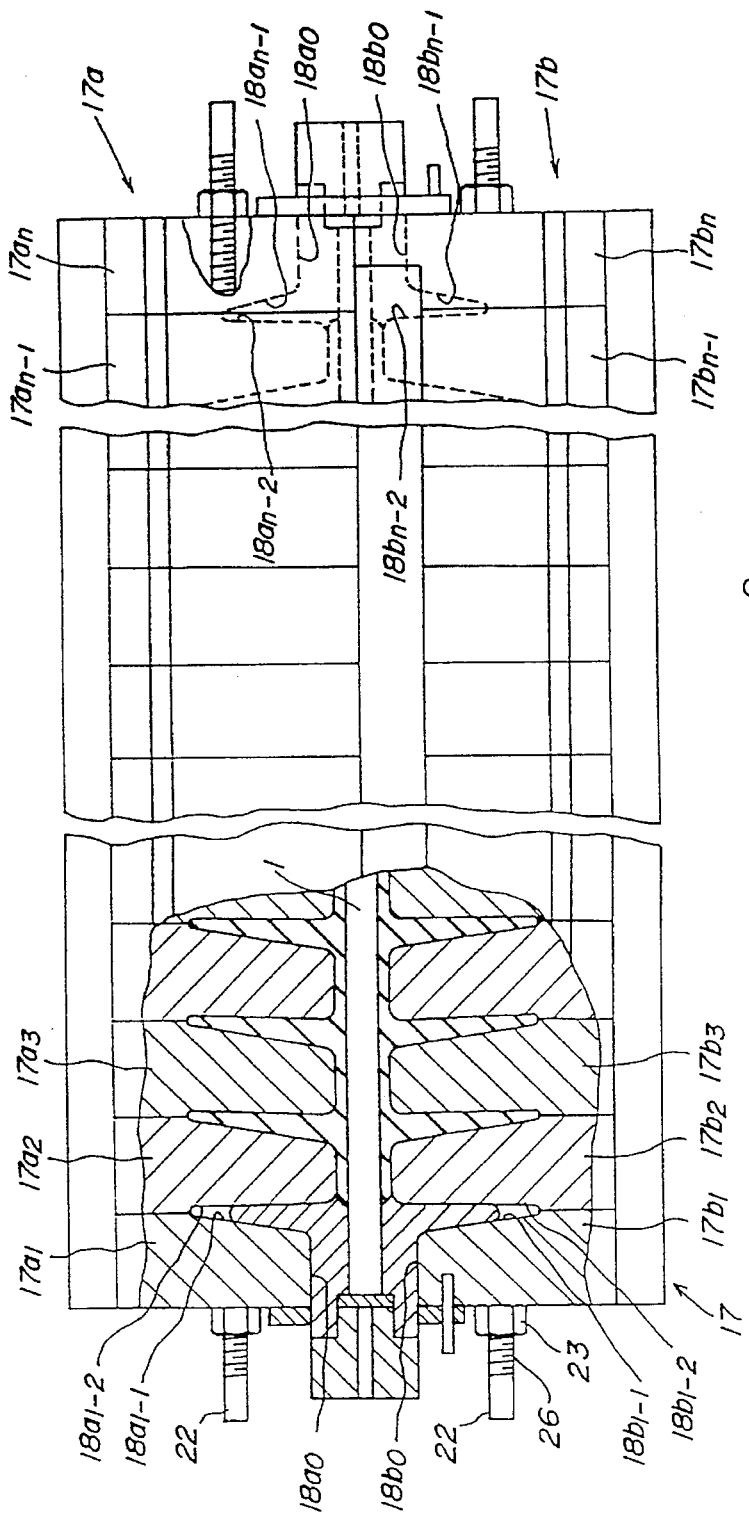
FIG._16a
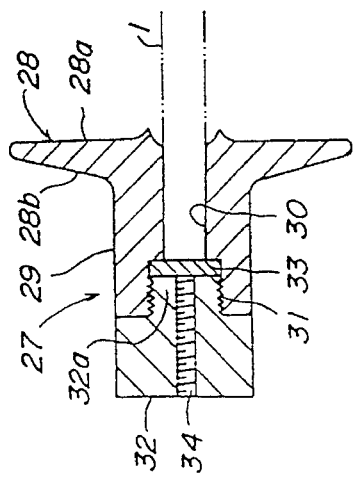
FIG._16b

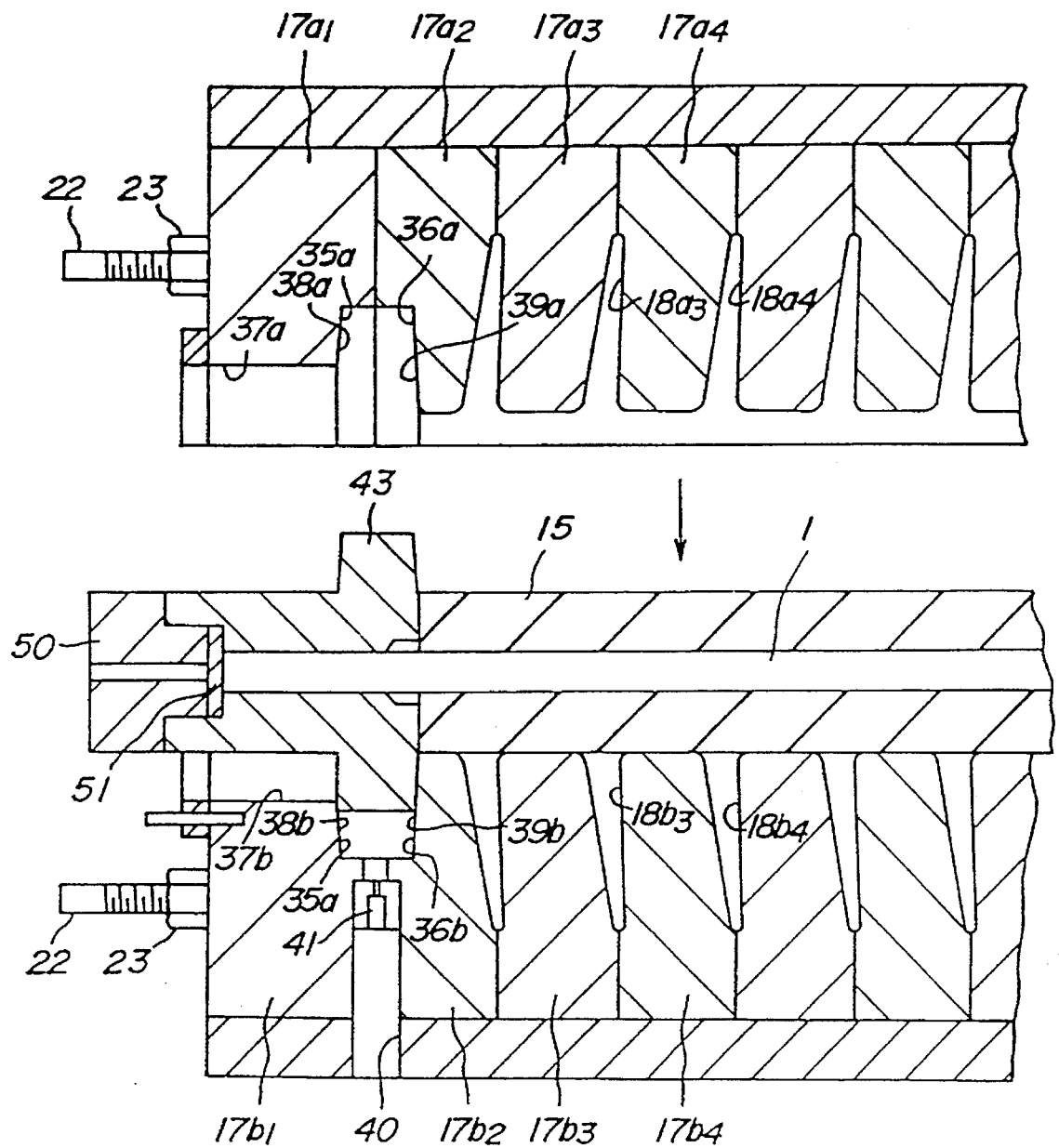
FIG_21

FIG_22
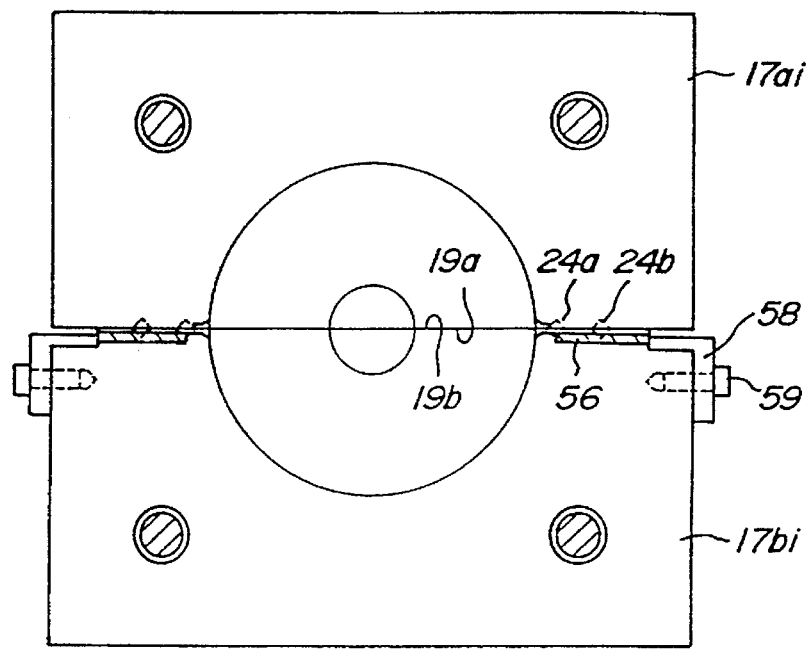
FIG_23
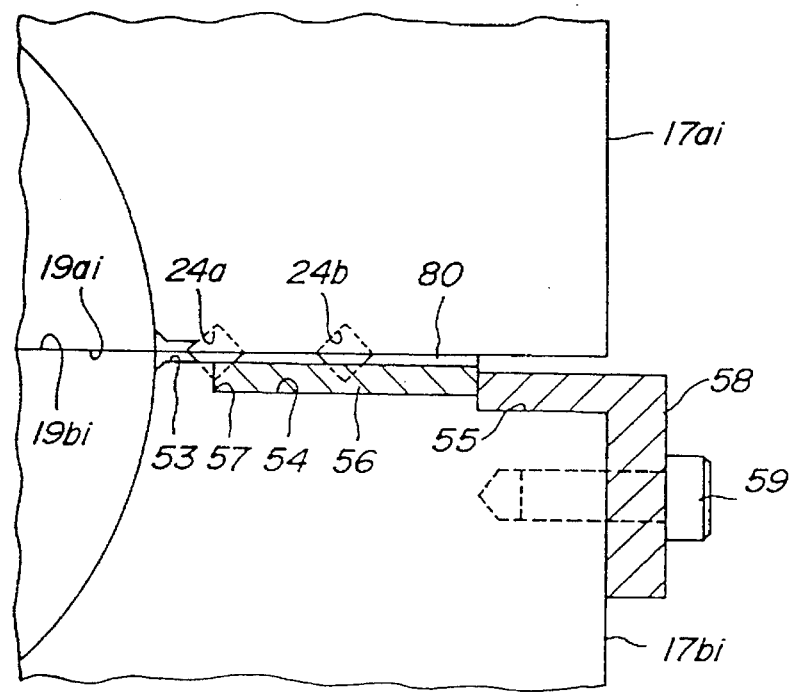

ly a long time to effect the molding for obtaining the necessary housing. In addition, when adhesion at the joined portion between the housings joined together is insufficient, water invades the insulator through the joined portion. Consequently, insulating property of the joined housings is deteriorated.

PROCESS AND AN APPARATUS FOR PRODUCING INSULATORS

BACKGROUND OF THE INVENTION (1) Field of the Invention

The present invention relates to a process and an apparatus for producing insulators. More particlarly, the invention relates to a process and an apparatus for producing insulators each having a rubbery housing integrally formed around an outer periphery of a core.

(2) Related Art Statement

In order to increase an insulating distance along a surface of the insulator, techniques are known to provide a number of shade portions around cores. As a process for forming a housing of rubber around an outer periphery of a core in the production of the insulator, a transfer molding process and an injection molding process have been employed.

Producing methods based on the transfer mold process are disclosed in Japanese patent application Laid-open Nos. 63-128,916 and 2-248,225. A molding apparatus used in the transfer molding process is constituted as shown in FIG. 1. A cavity 100 is defined between an upper mold unit 101 and a lower mold unit 102 when the mold units are closed. The cavity 100 has an inner peripheral surface for forming a sheath portion and shade portions of a housing of an insulator. A heater is provided in or for each of the upper and lower mold units 101 and 102. Injection gates 103 are provided in the upper mold unit 101 or the lower mold unit 102 (in this case, the gates 103 are provided in the lower mold units 101). A cylinder 104 is located under the lower mold unit 102, and is provided with a press-in piston 105. A pot 106 is defined between the piston 105 and the molds 101 and 102 inside the cylinder 104. Supports 108 are movable in a direction orthogonal to an axis of the cavity 100 by cylinders 109, and are adapted to support a core 107 in the cavity 100 on one side.

In the transfer molding process, the core 107 made of an FRP (fiber-reinforced resin) is first set inside the cavity 100 along the axis thereof. The core 107 is supported in this state by means of the supports 108. Then, a raw rubber composition is charged into the pot 106, and softened there by heating. Next, the softened rubber composition is fed into a space between the core 107 and the inner peripheral surface of the cavity 100 through the gates 103 by means of the piston 105. At that time, the core 107 is pressed by the raw rubber composition. However, since the core 107 is supported by the supports 108 on a side opposite to the gates 103, the core is not bent or displaced. The rubber composition is heated at a given temperature in the space defined by the inner periphery of the cavity 100 and the outer periphery of the core for a given time after the rubber composition is fully charged. Thereby, the raw rubber composition is vulcanized in this state to form a rubbery housing around the core 107.

However, according to the transfer molding process, the maximum possible length of the rubbery housing per one molding step is about 2 m considering that a long core 107 will be bent through forced charging of the raw rubber composition inside the cavity even when the supports 108 are provided. On the other hand, the length of the housing for the insulator currently used for super high voltage power transmission reaches as much as 5 m or more.

For this reason, since the length of the housing molded by the transfer molding is short, a plurality of the housings of the insulators must be integrally joined together when a long housing is necessary. Therefore, since a plurality of the housings must be molded separately, it unfavorably takes a long time to effect the molding for obtaining the necessary housing. In addition, when adhesion at the joined portion between the housings joined together is insufficient, water invades the insulator through the joined portion. Consequently, insulating property of the joined housings is deteriorated.

Furthermore, the supports 108 must be retracted from the inside of the cavity 100 at the final stage of filings the raw rubber-composition inside the cavity under pressure. Therefore, it is a troublesome operation to retract the supports 108. Moreover, since the molding used in the transfer molding process requires the pot, the gate, the supports, etc., the apparatus is complicated, and its production costs rise due to the complexity thereof.

On the other hand, Japanese patent application Laid-open No. 60-500,929 discloses an injection molding process for the production of the insulator. A molding apparatus used in this process is constructed as shown in FIG. 2. That is, a cavity 110 is defined between an upper mold unit 111 and a lower mold unit 112 united together through parting surfaces thereof when the mold units are closed, and an inner periphery of the cavity 110 has a shape constituting a barrel portion and shade portions of an insulator to be molded. An injection gate 113 is provided in one of the mold units (the mold unit 111 in this embodiment). A protective sleeve 114 is supported by supports 115 arranged in the upper and lower mold units 111 and 112. The supports 115 are movable by a cylinder 117 in a direction orthogonal to an axis of a core 116 placed inside the cavity.

The core 116 is first arranged inside the cavity 110, and the supports 115 are inwardly moved to press the protective sleeve 114 externally fitted around the core 116 at tips thereof. Thereby, the core 116 is held in the cavity 110 along an axis of the cavity. Next, a raw rubber composition is injected into the cavity around the outer periphery of the core 116 through the gate 113, so that a barrel portion and shelves of a housing are formed around the outer periphery of the core 116.

However, according to the injection molding process, the maximum possible length of the obtainable rubbery housing cannot be increased as in the case of the transfer molding process, because the core 116 is bent by the pressure of the rubber composition injected inside the cavity 110.

Therefore, when a long insulator is required, plural housings obtained in the injection molding process must be joined. Therefore, it takes a long time to mold a necessary number of the housings. In addition, since a joined portion exists in the long housing, insulating property of the housing is unfavorably deteriorated. Furthermore, there exists a troublesome operation to retract the supports 115 from the interior of the cavity 110 at a terminal stage in injecting the raw rubber composition. Further, the mold requires the supports, etc., which makes the mold complicated.

SUMMARY OF THE INVENTION

Therefore, it is an object of the present invention to provide a process for producing insulators by compression molding, which enables simple molding of the insulators.

It is another object of the present invention to provide a process for producing insulators each including an integrally long housing by compression molding.

It is a further object of the present invention to provide a process for producing insulators by compression molding, which enables a rubbery material to be readily spread to form a housing of the insulator.

It is a still further object of the present invention to provide a process for producing insulators by compression molding, which enables easy removal of a burr formed on a housing of the insulator.

It is a still further object of the present invention to provide a process for producing insulators by compression molding, which prevents excess rise in pressure inside a mold during the extrusion molding.

It is a still further object of the present invention to provide an apparatus for producing insulators by compression molding, which enables simple molding of the insulators.

It is a still further object of the present invention to provide an apparatus for producing insulators each including an integrally long housing by compression molding.

It is a still further object of the present invention to provide an apparatus for producing insulators by compression molding, which enables assured alignment of a core in a molding cavity.

The process for producing an insulator by compression molding according to a first aspect of the present invention, the insulator having a core and a housing with a sheath portion and at least one shade portion around the sheath portion, includes the steps of:

(A) preliminarily forming a rubbery layer around an outer periphery of the core to obtain a preliminarily molded body by extrusion molding;

(B) placing the preliminarily molded body between at least two mold units of a mold;

(C) forming a compressed molding by compression molding the preliminarily molded body in a given shape inside a cavity defined by the at least two mold units;

(D) curing the resulting molding.

According to the producing process of the first aspect of the present invention, since the preliminary molding is separately effected from the compression molding and the insulator can be obtained by compression molding the preliminarily molded body, even the insulator having a large length can be integrally produced by using a simpler insulator-molding device.

The following are preferred for the producing process of the first aspect of the present invention.

(1) Before the above step (B), the rubber layer is removed from the preliminarily molded body at opposite ends thereof.

(2) In the step (A), a long preliminarily molded body is formed and cut into a plurality of preliminarily molded bodies having a given length to be subjected to the steps (B)–(D). In this case, the above preferable step (1) may be employed.

(3) Before the preliminary shaping step, the core is washed and dried, and an adhesive is applied to an outer periphery of the core. In this case, the rubber layer can be firmly bonded to the outer periphery of the core.

(4) A burr formed around an outer surface of the insulator is removed after the curing. The insulator having a clear surface can be obtained.

(5) The volume of the rubber layer in the preliminarily shaped body is greater than a volume of the cavity of the mold. In this case, the rubber layer can be easily spread entirely over the cavity of the mold.

(6) The preliminarily molded body is placed between the upper and lower mold units, and an additional rubber layer is arranged between the upper and lower molds on each of right and left sides of the preliminarily molded body, followed by the compression molding and the curing. In this case, the rubber layer can be easily spread entirely inside a portion of the cavity corresponding to the shade portion of the insulator.

(7) Before the step (B), a locating member is fitted to the core for locating the core relative to the mold during the molding, and the preliminarily molded body is compression molded, while the core is appropriately located through contacting or guiding between a locating face of the locating member and a corresponding locating face provided in or on the mold.

(8) In the step (C), the internal pressure inside the cavity of the mold is appropriately regulated by means of a rubber-escaping groove continuing to the cavity of the mold and provided at a parting interface between the mold units.

Next, an apparatus for producing an insulator according to the first aspect of the present invention, which insulator has a core as well as a sheath portion and at least one shade portion around the sheath portion, by compression molding, includes:

(A) a preliminary molding unit for preliminarily shaping a rubbery layer around an outer periphery of the core to obtain a preliminarily molded body;

(B) a molding unit for forming a compressed molding by placing the preliminarily molded body between at least two mold units of a mold and compression molding the preliminarily molded body in a given shape inside a cavity defined by the at least two mold units; and (C) a heater for curing the rubber in the rubber layer.

According to the producing apparatus of the present invention, since the preliminary molding is separately effected from the compression molding and the insulator can be obtained by compression molding the preliminarily molded body, even the insulator having a large length can be integrally produced by using a simpler insulator-molding device.

The following are preferred embodiments of the producing apparatus of the present invention.

(1) Each mold unit is constituted by a plurality of molding segments piled and tightened one upon another. In this case, the length of the housing can be easily varied by changing the number of the molding segments for the mold units.

(2) At least one of the mold units is provided with at least one groove formed around a boundary edge of a molding face defined by the cavity at a parting surface of the mold. In this case, an excess portion of the rubber in the rubber layer overflowing the cavity is effectively caught by the groove to form a rigid burr portion around the boundary edge of the molding face at the parting surface. Consequently, the burr formed along the outer periphery of the insulator can be easily removed.

(3) The mold is provided with a section for receiving a locating member which is fitted to an end portion of the core of the preliminarily molded body. By so doing, the locating member is fitted to an end portion of the core of the preliminarily molded body, and while the preliminarily molded body is compression molded, the core is located at a desired location in the cavity of the mold as the locating member is received in the locating member-receiving section of the mold.

(4) A rubber-escaping groove is provided at a parting interface between the mold units such that the groove continues to the cavity of the mold. By so doing the internal pressure inside the cavity of the mold can be appropriately kept at a given level upon molding and curing.

The above (7) in the preferred embodiments of the process of the present invention and the above (3) in the preferred embodiments of the apparatus of the present invention (hereinafter referred to as "second aspect" of the present invention) are based on the following knowledge.

That is, the present inventors have found through further investigations that although the core is positioned in a central portion of the preliminarily molded body by forming the rubber layer around the outer periphery of the core by extrusion, it is not necessarily easy to obtain the insulator in which the core is accurately located as desired in the housing after the compression molding and the curing. A second aspect of the present invention is based on the above discovery.

Referring to the second aspect of the present invention in more detail, the process for producing an insulator, includes the steps of:

(A) preparing a preliminarily molded product by forming a rubber layer around an outer periphery of a core;
(B) fitting, to the core of the preliminarily molded body, a locating member for locating the core relative to a mold when the preliminarily molded body is to be molded in the mold, the location member having a locating face to be located relative to the mold;
(C) setting preliminarily molded article on a stationary mold in a state that the mold including the stationary mold unit and a movable mold unit is open, the mold having a molding face as well as a locating face to be located relative to the locating face of the locating member;
(D) compression molding the rubbery layer around the outer periphery of the core by closing the movable mold unit to the stationary mold unit while locating the core at a given location by butting the locating face of the locating member against that of the mold; and
(E) curing the rubber in the rubber layer by heating.

Further, the device for molding a composite insulator according to the second aspect according to the present invention comprises:

(A) a mold constituted by a stationary mold unit fixedly arranged, and a movable mold unit to be closed to the stationary mold unit, the stationary mold unit and the movable mold unit having respective molding faces on opposed sides thereof and forming a molding cavity therebetween when the movable mold unit is closed to the stationary mold unit; and
(B) a locating member having a locating member for locating a core of the insulator relative to the mold when a preliminarily molded body prepared by forming a rubber layer around the core is to be molded in the molding cavity of the mold, the locating member having a locating face to be located relative to a locating face provided at the mold;

wherein the core of the insulator is located at a given location by butting the locating face of the locating member against that of the mold upon molding.

The following are preferred as the second aspect of the present invention:

(1) The locating member includes a pair of locating members to be fitted to opposite ends of the core, and each of a pair of the locating members has a locating face, while the core has a pair of locating faces to be located to those of the locating members. In this case, the core can be assuredly located at a given location within the housing.
(2) Each of a pair of the locating members is to be located inside the mold at opposite ends thereof, and the locating face of the locating member is constituted by a pair of locating faces so inclined relative to a central axis of the cavity of the mold that an axial distance between the inclined faces of the locating member may become narrower in a radially outer direction, while the mold is provided with locating faces corresponding to the locating faces of a pair of the locating members. In this case, the core can be more easily and assuredly located at a given location within the mold.
(3) Each of the upper and lower mold units is constituted by a plurality of mold elements piled and tightened one upon another, and inner surfaces of portions of the molding cavity of the molding elements at opposite ends are employed as the locating faces of the mold, while the locating faces of the locating member are to be butted against said corresponding inner surfaces.
(4) Each of the locating members to be located at each of the opposite ends mold is a cap to enclose an end portion of the core.
(5) The housing of the insulator includes a shade portion and a sheath portion, and the molding face of the mold is constituted by a first molding face for molding the shade portion of the housing and a second molding face for molding the sheath portion of the housing.

The above (8) in the preferred embodiment of the process of the present invention and the above (4) in the preferred embodiments of the apparatus according to the first aspect of the present invention (hereinafter referred to as "third aspect" of the present invention) are based on the following knowledge.

That is, the present inventors have found that although a some excess amount of rubber in the rubber layer of the preliminarily molded body is preferable to assuredly spread the rubber all over the molding cavity, excess rise in pressure inside the cavity is preferably suppressed. That is, according to the third aspect of the present invention, the inner pressure inside the molding cavity of the mold is kept to an appropriate level during the molding.

The following are preferred as the third aspect of the present invention.

(1) The rubber-escaping groove extends from the outermost peripheral portion of the shade portion to the outer periphery of the mold. In this case, excess rise in pressure inside the molding cavity can be more assuredly prevented.
(2) A key groove is formed at a parting face of at least one of the upper and lower mold units and extending between the molding face of the molding cavity of the mold and the outer periphery of the mold, and a rubber-escaping groove having an appropriate depth is defined by fitting a key having a given height into the key groove. In this case, the depth of the rubber-escaping groove can be varied by exchanging the key.
(3) The rubber-escaping groove is provided to extend to the molding cavity at a position corresponding to the rear surface of the shelf. In this case, since a rubber-escaping trace remains on the rear face of the shed, good appearance of the composite insulator can be obtained.

These and other objects, features and effects can be well understood upon reading the following description of the invention when taken in connection with the attached drawings.

BRIEF DESCRIPTION OF THE ATTACHED DRAWINGS

For a better understanding of the invention, reference is made to the attached drawings, wherein:

FIG. 2 is a sectional view for illustrating a conventional apparatus for producing such an insulator by injection molding;

FIG. 3(a) is a partial sectional view of a composite insulator produced by the present invention, which has metallic fitting members fitted at opposite ends.

FIG. 4 is a block diagram for illustrating the outline of a process for producing a composite insulator according to the present invention;

FIG. 5 is a plane view for illustrating the operation of an extruder with a crosshead to be used in a preliminary molding step of the producing process of the present invention;

FIG. 6 is a front view of a preliminarily molded body which is obtained by the preliminary molding step with a rubber layer removed at opposite end portions;

FIG. 7 is a vertically sectional view for illustrating a situation in which the preliminarily molded body is placed inside a mold, while the mold is opened;

FIG. 8 is a sectional view of FIG. 7 as viewed in a plane taken along a line VIII—VIII;

FIG. 9 is a radially sectional view for illustrating the state in which the upper mold unit and the lower mold unit are closely pressed against each other and pressure is applied thereupon;

FIG. 10 is a partial sectional view for illustrating a part of a housing of a composite insulator produced;

FIGS. 11 and 12 are sectional views for illustrating other preliminarily molded bodies obtained by the preliminary molding step;

FIG. 14(a) is a plane view of a part of a lower mold in which two rows of rubber-escaping grooves are formed along an edge of a molding cavity at a parting face thereof, and FIG. 14(b) is a sectional view for illustrating the two rows of the rubber-escaping grooves formed along the edge of the molding cavity at the parting face;

FIG. 15(a) is a plane view for illustrating a modification of the composite insuator-producing process according to the first aspect of the present invention, and FIG. 15(b) is a sectional view for illustrating this producing process as taken along a line XVI—XVI;

FIG. 16(a) is a partial sectional view for illustrating a method and an apparatus for producing a composite insulator according to a second aspect of the present invention, and FIG. 16(b) is a sectional view of a locating member to be used in FIG. 16(a);

FIG. 21 is a vertical and axial sectional view for illustrating a state in which the preliminarily molded body is set in a mold together with the end caps;

FIG. 22 is a radial sectional view for illustrating an embodiment according to the third aspect of the present invention in which a rubber-escaping groove is formed at a parting face of a lower-mold;

FIG. 23 is a partial sectional front view for illustrating a butted portion between an upper molding segment and a lower molding segment;

DETAILED DESCRIPTION OF THE INVENTION

Figure 1:
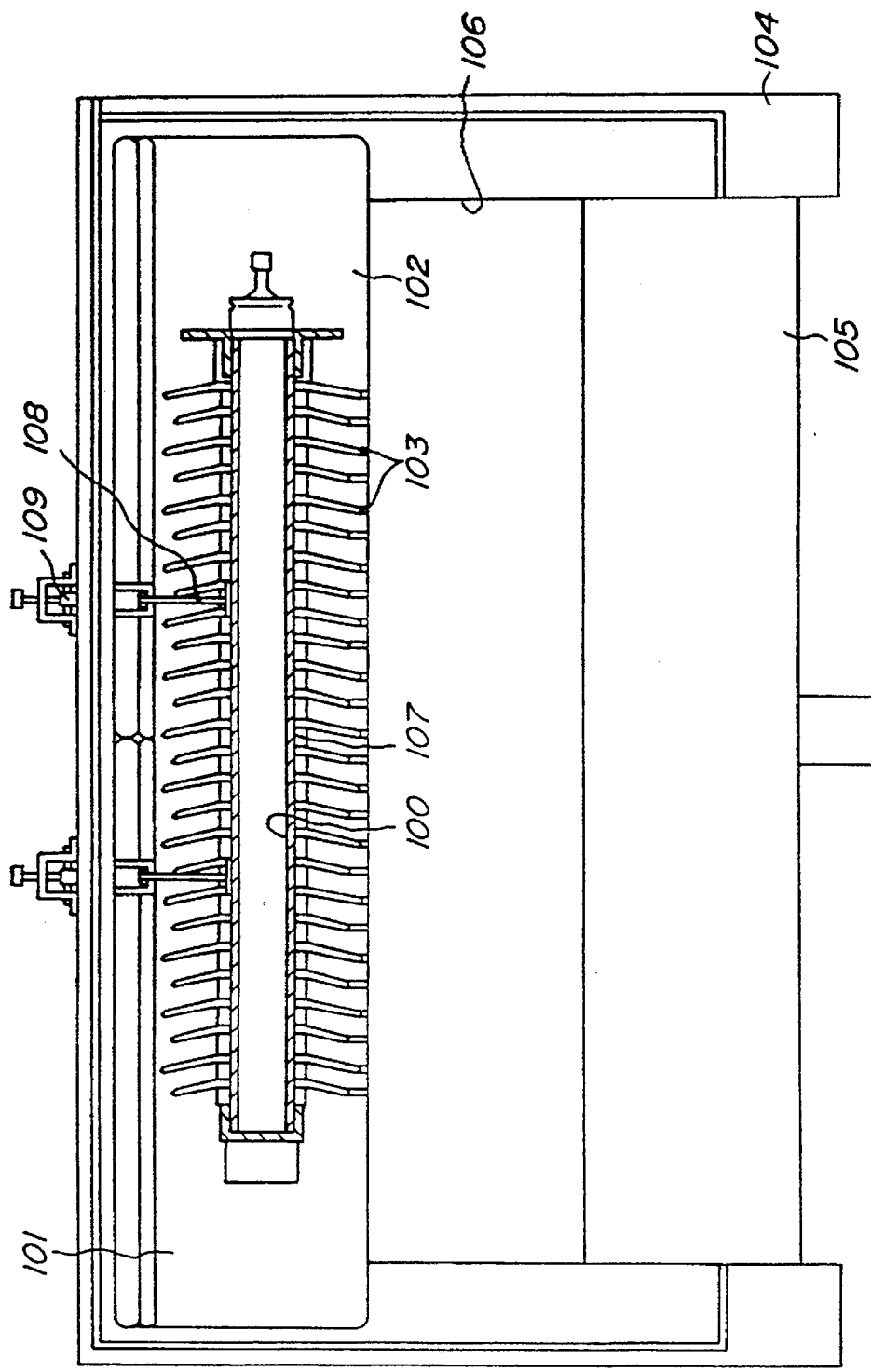
FIG. 1 is a sectional view for illustrating a conventional apparatus for producing an insulator with a plurality of shade portions around a core by transfer molding.
Figure 3B:
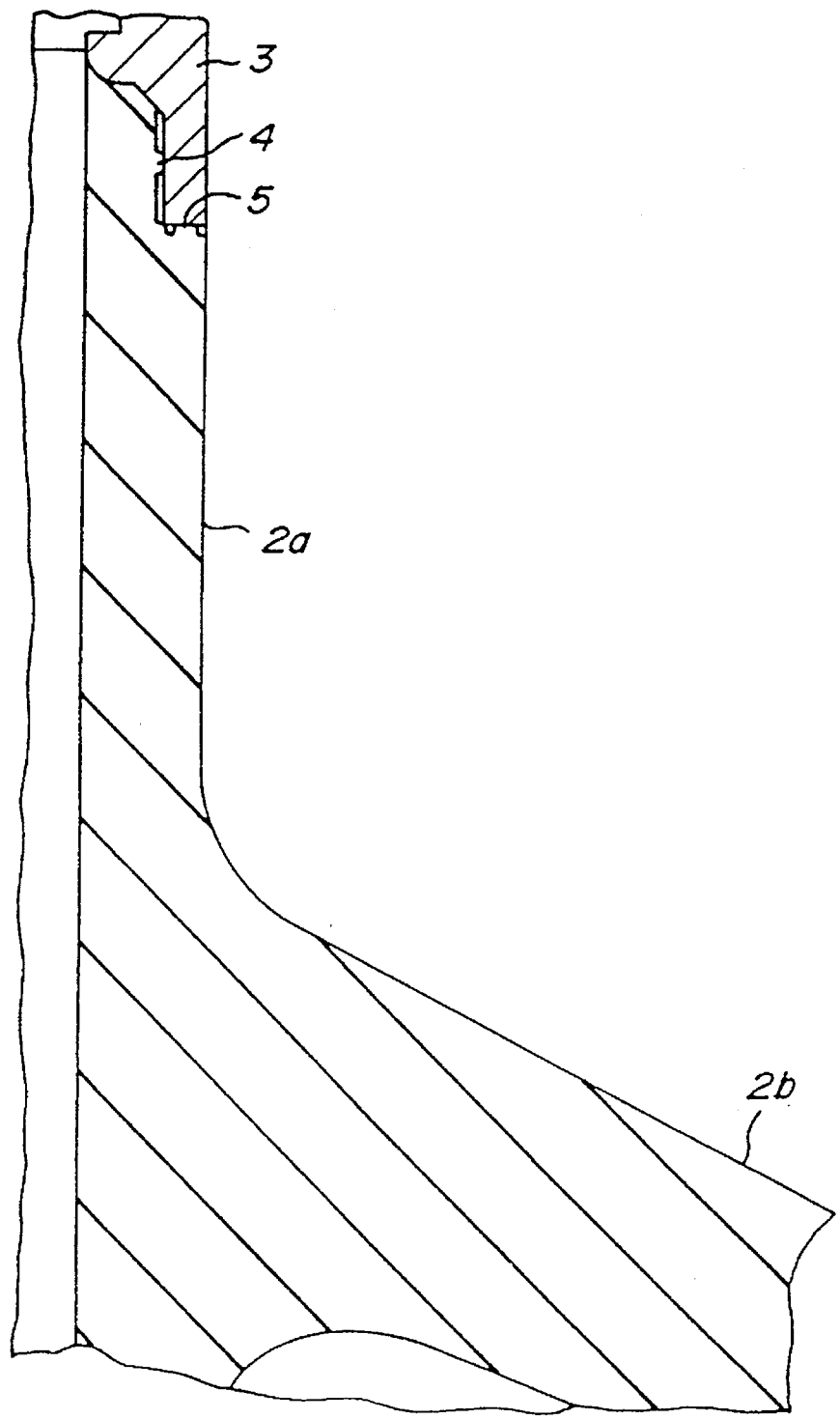
FIG. 3(b) is a sectional view of a right half of an end portion of the insulator in FIG. 3(a)

FIGS. 3(a) and 3(b) illustrate one embodiment of the composite insulators to be produced according to the present invention. The composite insulator includes a rod-shaped core 1 and a housing 2 integrally and concentrically bonded around the outer periphery of the core 1. The core 1 is made of, for example, a fiber-reinforced plastic (FRP), and has a circular sectional shape. The housing 2 includes a sheath portion 2a and a plurality of shade portions 2b. The sheath portion 2a and the shade portions 2b of the housing 2 are made of, for example, an ethylene-propyrene-diene copolymer rubber (EPDM) or silicon rubber.

To opposite ends of the core 1 are fixed metallic fitting members 3. An electric wire is to be supported by one of the metallic fitting members 3. The other metallic fitting member 3 is to be fixed to a power-transmission tower or the like. Annular projections 4 and 5 are formed at each of the end portions of the housing 2. Gas tightness is assured between the housing 2 and the metallic fitting member 3 by means of the projections 4 and 5. The term "composite insulators" is used herein to mean insulators which are each composed of a core and a housing provided around the outer periphery of the core, the core and the housing being made of different materials.

In general, the sheath portion 2a and the shade portion 2b are designed to have the following dimensions. That is, as shown in FIG. 10, a radial length "a" of the shade portion is not less than 7 times a thickness "b" of a root portion of the shade portion 2b. The radial length "a" of the shade portion 2b is also not less than 0.7 times a space "p" between the adjacent shade portions 2b. The radial length "a" of the shade portion 2b is generally 50–70 mm, and the thickness "t" of the sheath portion 2a is 3–5 mm, ordinarily 5 mm.

Next, the process for the producing the composite body according to the first aspect of the present invention will be explained below.

Referring to FIG. 4, the producing process of the first aspect of the invention includes a coating step 6, a preliminary molding step 7, a compression molding step 8 and a finishing step 9. In the coating step 6, the outer peripheral surface of a core 1 made of an FRP or the like is coated with an adhesive after the core is washed and dried. In the preliminary molding step 7, a layer of a raw rubber composition is formed concentrically around the outer periphery of the core. Before the compression molding step, the rubber layer may be removed from the preliminarily molded body (See a step 7 in FIG. 4). In the compressing molding step 8, the preliminarily molded body is compression molded. In this compression molding step, the compression molded body may be cured by heating. In the finishing step 17, a burr formed around the molded and cured housing is removed.

Next, the apparatus for producing the composite insulator according to the present invention will be explained below.

FIG. 5 shows an extruder 10 to be used in the preliminary molding step 7. The extruder 10 is adapted to extrude the raw rubber composition R around the core 1, and includes an extruding unit 11, a passage 12 for the raw rubber composition R and a cross head 13 through which the rod-shaped core 1 is axially passed. A rubber layer 13 is concentrically formed around the outer periphery of the core 1 of FRP.

A preliminarily molded body 15 obained in the above preliminarily molding step, while cutting end portions 8a, 8a of the rubber layer 14, is compression molded in the compression molding step 8 by using a molding device 16 as shown in FIGS. 4 and 7 (only a mold 17 is shown in these figures). The molding device includes an upper mold unit 17a and a lower mold unit 17b. The upper and lower mold units 17a and 17b, which constitutes the mold 17 are provided with cavities 18b and 18b of which the inner peripheral surfaces define the outer profile of a housing 2 of an insulator. That is, these cavities 18a and 18b have shapes to form the shapes of the sheath portion 2a and the shade portions 2b. Since a molten raw rubber composition is not poured into cavities 18a and 18b of the upper and lower mold unit 17a and 17b, the molding apparatus 16 requires neither pot nor gate different from the molding apparatus used in the transfer molding apparatus or the injection molding apparatus. The molding device 16 is provided with a heater and a pressing unit for tightening the upper and lower molds 17a, 17b for the compression molding. The heater or the pressing unit is not shown, because the skilled person would employ such in the compression molding unit. By the molding device 16, the preliminarily molded body 15 is compression molded, and the rubber layer is vulcanized by heating. After the compression molding, the mold is opened, and the resulting insulator having the core 1 and the housing 2 is released therefrom.

In the following, the principal steps of the producing steps will be explained in more detail with reference to the producing steps in FIG. 4 as well as to the producing apparatus shown in FIGS. 5, 7, 8 and 9.

After the coating step 6, the raw rubber composition R is fed into the crosshead 13 through the passage 12 by means of the extruding unit 11 under pressure. Into the raw rubber composition R is incorporated a vulcanizer such as an organic peroxide or sulfur. The core made of FRP or the like, cut in a given length, is fed into the crosshead 13, and the rubber layer 14 is concentrically formed around the outer periphery of the core 1, while being bonded thereto with an adhesive. The viscosity ($ML_{1+4}$, 100° C.) of the raw rubber composition is preferably set at 15–30, and more preferably at 10–23. The raw rubber composition is ordinarily composed mainly of EPDM or silicone rubber, and includes ordinary additives.

The boundary between the core 1 and the rubber layer 14 is made void-free, which means "free from bubbles".

As shown in FIG. 6, the preliminarily molded body 15 formed by the above preliminary molding step 7 is cut in a given length, and the rubber layer is cut and peeled off at 14a at opposite ends of the core 1 (Step 7 in FIG. 4). The volume of the rubber layer 14 of the preliminarily molded body 15 from which the rubber layers 14a have been removed at the opposite ends of the core 1 is set greater than the total volume of the cavities 18a and 18b of the mold 17 so that the rubber composition may be fully spread over the cavities. More specifically, the volume of the rubber layer 14 of the preliminarily molded body 15 as in FIG. 6 is preferably 1.05 to 1.30 times, and ordinarily about 1.15 times the total volume of the cavities 18a and 18b.

Then, in the compression molding step 8 shown in FIGS. 7–9, the preliminarily molded body 15 is placed inside a space defined between the upper and lower mold units 17a, 17b, while the mold 17 is opened. The mold 17 is heated at a given temperature, and the preliminarily molded body 15 is compression molded into a given shape by closing the upper and lower mold units 17a, 17b relative to each other through operating the pressing means not shown. Thereby, the housing 2 which includes the sheath portion 2a and a plurality of the shade portions 2b is formed around the core 1. At that time, when the volume of the rubber layer of the preliminarily molded body 15 is set greater than the total volume of the cavities 18a, 18b and the preliminarily molded body 15 is compression molded by the mold 17, the rubber of the rubber layer 14 fills the entire cavities 18a and 18b to expel air inside the cavities 18a, 18b. On the other hand, a part of the rubber of the rubber layer 14 is pushed out from the cavities 18a and 18b to the parting interface 19 as an excess material, thereby forming a burr projecting from the housing 2. As shown in FIG. 10, the burr 20 is formed around the sheath portion 2a and the shade portions 2b at the parting interface 19. Since the core 1 is uniformly pressed in all directions by the upper and lower molds 17a and 17b during the molding, the core 1 is not bent. This enables use of long cores 1.

The heating temperature, i.e., the vulcanizing temperature in the molding step is ordinarily set at 150°–180° C. and the heating time is around 10 minutes. Since the adhesive is present around the outer peripheral surface of the core 1 a boundary layer having high electric insulation is formed between the sheath portion 2a and the core 1 through the vulcanization and bonding. The crosslinked structure is formed in the rubber through the action of the vulcanizing agent inside the rubber layer by heating under pressure. Consequently, elasticity is imparted upon the rubber, and firmly adhering forces are developed between the rubber and the core 1.

Finally, after the mold is opened, the burr of the housing 2 is removed, thereby obtaining a finished product. The burr formed at edge portions of the outer periphery of the shed portions 2b is easily removed by using scissors or a knife, and the remaining burr at the other portion is removed by hand.

As mentioned above, according to the present invention, the housing having a length of not less than 5 m can be molded integrally with the core from the preliminarily molded body by using the compression molding apparatus with the mold having a large length without any special difficulty. Therefore, different from a case where short housings are joined together, since no seam exists in the long housing 2, reduction in insulating property of the housing 2 is not feared. In addition, since the molding device does not need a pot, a gate or supports, the construction thereof is simple.

Figure 12:
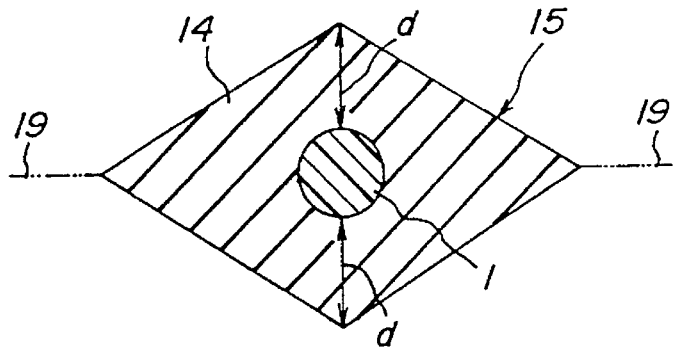

In the above, only the preliminarily molded body 15 having the circular section has been described. However, the sectional shape of the preliminarily molded body 15 may be elliptical (as shown in FIG. 11) or rhombic (as shown in FIG. 12). In these case, it is preferable that the ratio of a minor axis to a major axis in the elliptical shape and the ratio of a longer diagonal to a shorter diagonal in the rhombic section are preferably set at not more than 1:3. Further, the cavities 11 and 12 are preferably designed such that the major axis (FIG. 11) or the longer diagonal (FIG. 12) is located at the position of the parting interface 19 of the mold.

In this case, when the cavities 18a and 18a have the same volume as that of the above embodiment, a distance "d" between the remotest portion from the parting interface 19 constituted by the mold units 17a and 17b and the outer peripheral surface of the core 1 is shorter. Consequently, the raw rubber composition R inside the cavities 18a and 18b more easily moves outwardly in a direction of the parting interface 19. Accordingly, the production of housings having incomplete shapes can be prevented. This improves yield in molding the housings.

Figure 13:
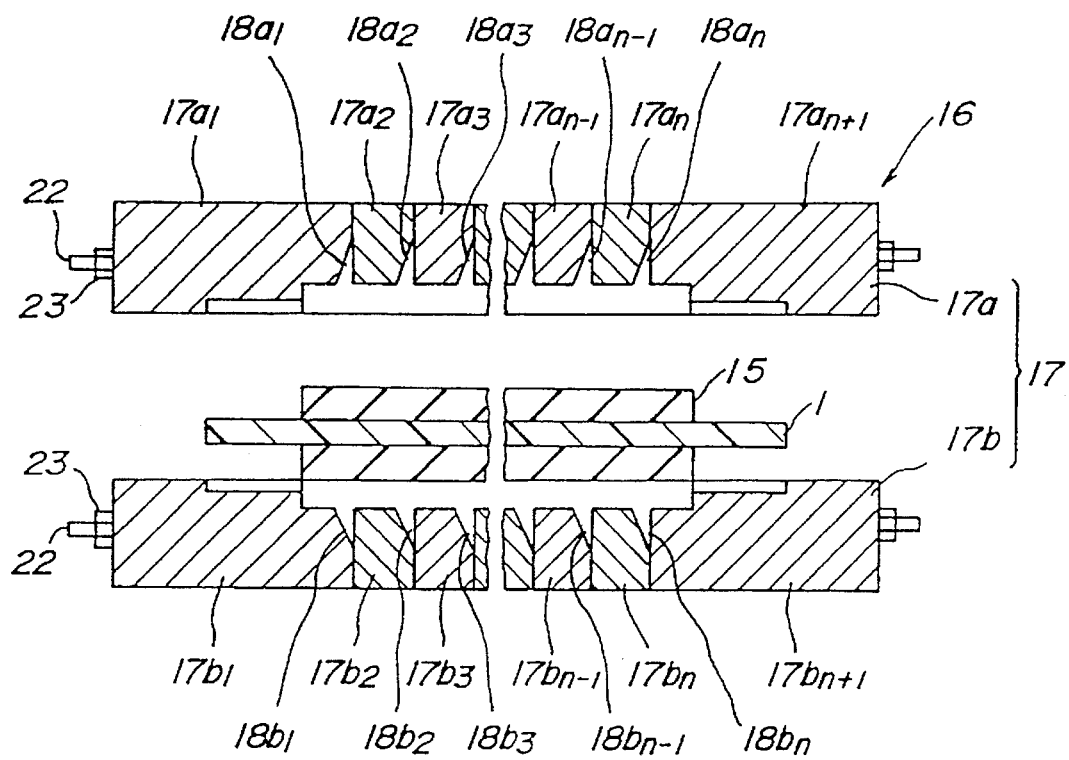
FIG. 13 is an axial sectional view for illustrating another mold in which each of upper and lower mold units is constituted by a plurality of molding elements piled and tightened one upon another.

Although each of the upper mold unit and the lower mold unit is of an integral type in the above embodiments, as shown in FIG. 13, each mold unit may be constituted by a plurality of molding segments $17a_1, 17a_2, 17a_3, \ldots 17a_n$; $17b_1, 17b_2, 17b_3 \ldots 17b_n$) piled and tightened one upon another through long bolts 22 passed through respective holes formed in the molding segments. Nuts 23 are screwed to the bolt 22 at opposite ends thereof to firmly tighten the molding segments. These segments have substantially same configuration, excluding those at the opposite ends of the mold. A shade portion is to be formed between adjacent molding segments of the upper and lower mold units. In this embodiment, the length of the housing can be arbitrarily changed by changing the number of the molding segments piled one upon another for each of the mold units.

FIGS. 14(a) and 14(b) illustrate another embodiment of the compression mold in which two rows of V-grooves 24a, 24b are formed at parting faces $19a_i$, $19b_i$ of molding segments $17a_i$, $17b_i$ along the cavity $18a_i$, $18b_i$ in each of the upper and lower molds 17a, 17b. FIG. 14(a) is a side view of upper and lower molding segments $17a_i$, $17b_i$ butted together, and FIG. 14(b) is a plane view of lower molding segments $17b_i$, 17b+1 piled one upon another. This embodiment is similarly applicable to the upper molding unit and the lower molding unit each of which is of an integral type as shown in FIG. 7. Since the linear rigid portions are formed by the V-grooves 24a, 24b in the burr formed on the outer periphery of the housing at the parting interface, the burr can be easily removed. When the inner edge of the inner V-groove 24a is formed by an edge of each of the cavities $18a_i$, $18b_i$ as shown in FIGS. 14(a) and 14(b) by a dotted line, the burr can be more easily and clearly removed.

FIGS. 15(a) and 15(b) illustrate another embodiment of the first aspect of the producing process of the invention in which a pair of strips 25 of the raw rubber composition R are placed on the lower mold unit 17b on opposite sides of the preliminarily molded body 15. This embodiment has been contrived based on the following knowledge. That is, if the diameter of the shade portions is small, the preliminarily molded body 15 having the volume of the rubber being around 1.1 times the total volume of the cavities 18a, 18b of the upper and lower mold units 17a, 17b can be molded to give an excellent insulator with a housing. However, when the diameter of the shade portions becomes greater, the volume of the rubber being equal to around 1.3 times the total volume of the cavities of the upper and lower mold units becomes necessary. Under the circumstances, the inventors have discovered that when a pair of the strips 25 of the raw rubber composition R are arranged as in FIGS. 15(a) and 15(b) to fill portions of the cavities corresponding to tip portions of the shade portions 2b, the volume of the preliminarily molded body needs not be so increased.

The above embodiment of the first aspect of the present invention is to be considered as illustrative and not restrictive, but the first aspect of the invention may be modified in various ways within the scope of the claims attached to the specification.

Next, the second aspect of the present invention will be explained below.

FIGS. 16(a) and 16(b) illustrate an embodiment of the second aspect of the present invention. More specifically, FIG. 16(a) illustrate a mold 17 for the production of an insulator similar to that in FIG. 13. The mold 17 is constituted by an upper mold unit 17a as a movable mold and a lower mold unit 17b as a stationary mold unit. Each of the upper and lower mold units 17a, 17b is constituted by a plurality of molding segments ($17a_1, 17a_2, 17a_3, \ldots 17a_n$; $17b_1, 17b_2, 17b_3, \ldots 17b_n$) having the same shape, excluding $17a_1, 17a_n, 17b_1, 17b_n$. These segments $17a_1, 17a_n, 17b_1$ and $17b_n$ have almost the same shape. These molding segments of each of the upper and lower mold units are tightened by passing long bolts 22 through holes bored in the segments on opposite sides thereof and screwing nuts 23 to threads 26 formed around the bolts at end portions of the mold. In this embodiment, the length of the mold may be varied by changing the number of the segments $17a_1, \ldots 17a_n$; $17b_1, \ldots 17b_n$ of each of the upper and lower mold units 17a, 17b.

In FIG. 16(a), a locating member shown in FIG. 16(b) is fitted to the molding segments ($17a_1, 17a_2$; $17b_1, 17b_2$; $17a_{n-1}, 17a_n$; $17b_{n-1}, 17b_n$ at each of opposite ends of the mold 17 by utilizing a molding cavity sections $18a_1, 18b_1$; $18a_{n-1}, 18b_{n-1}$ defined between the adjacent molding segments ($17a_1, 17a_2$; $17b_1, 17b_2$; $17a_{n-1}, 17a_n$; $17b_{n-1}, 17b_n$). The locating member is designed in the form of an end cap 27 as the locating means, and includes a guide portion 28 having a larger diameter. Faces 28a and 28b on the opposite side of the guide portion 28 are inclined corresponding to the inclined faces $18a_{1-1}, 18a_{1-2}, 18b_{1-1}, 18b_{1-2}$ of the cavity section 18 at the same angles. Behind the guide portion 28 is provided a small diameter portion 29. A gripping hole 30 is bored in a central portion of the guide portion 28 and the small diameter portion 29 of the end cap 27. A threaded hole 31, which has a larger diameter than that of the gripping hole 30, is bored in the small diameter portion 29 on a side opposite to the guide portion 28. To the threaded hole 31 is screwed a smaller diameter threaded portion 32a of an end portion 32 having the same diameter as that of the small diameter portion 29, while a shim 33 is interposed between the bottom the threaded hole 31 and the threaded portion 32a. The shim is pressed against the bottom of the threaded hole 31 by means of a screw bolt 34 screwed to threads formed around a central hole bored through the end portion 32. Larger holes $18a_0, 18b_0$ are formed in a central portion of the molding segments $17a_1, 17b_1, 17a_n, 17b_n$ and the portions 29 and 32 of the end cap are intimately fitted into the large holes. The preliminarily molded body is set between the upper mold unit 17a and the lower mold unit 17b in the state that the end cap 27 is fitted around each of the opposite ends of the core 1.

Referring further to the end cap, the shim 33 provided therein receives the end of the core 1. That is, the shim is made of a material such as a fluorine resin so that when the core is expanded and butted to the shim under heating the insulator, the shim may receive the end of the core 1 to prevent damage upon the end of the core 1.

When the mold shown in FIG. 16(a) is employed together with the end caps 27 for the compression molding, the core 1 can be located at an appropriate location inside the housing 2 of the insulator by butting the locating faces 28a, 28b (inclined faces) of the locating members 27 against those ($18a_{1-1}$, $18a_{1-2}$, $18b_{1-1}$, $18b_{1-2}$, ... ) of the adjacent molding segments (cavity sections) at the opposite ends of the mold 17.

Figure 17:
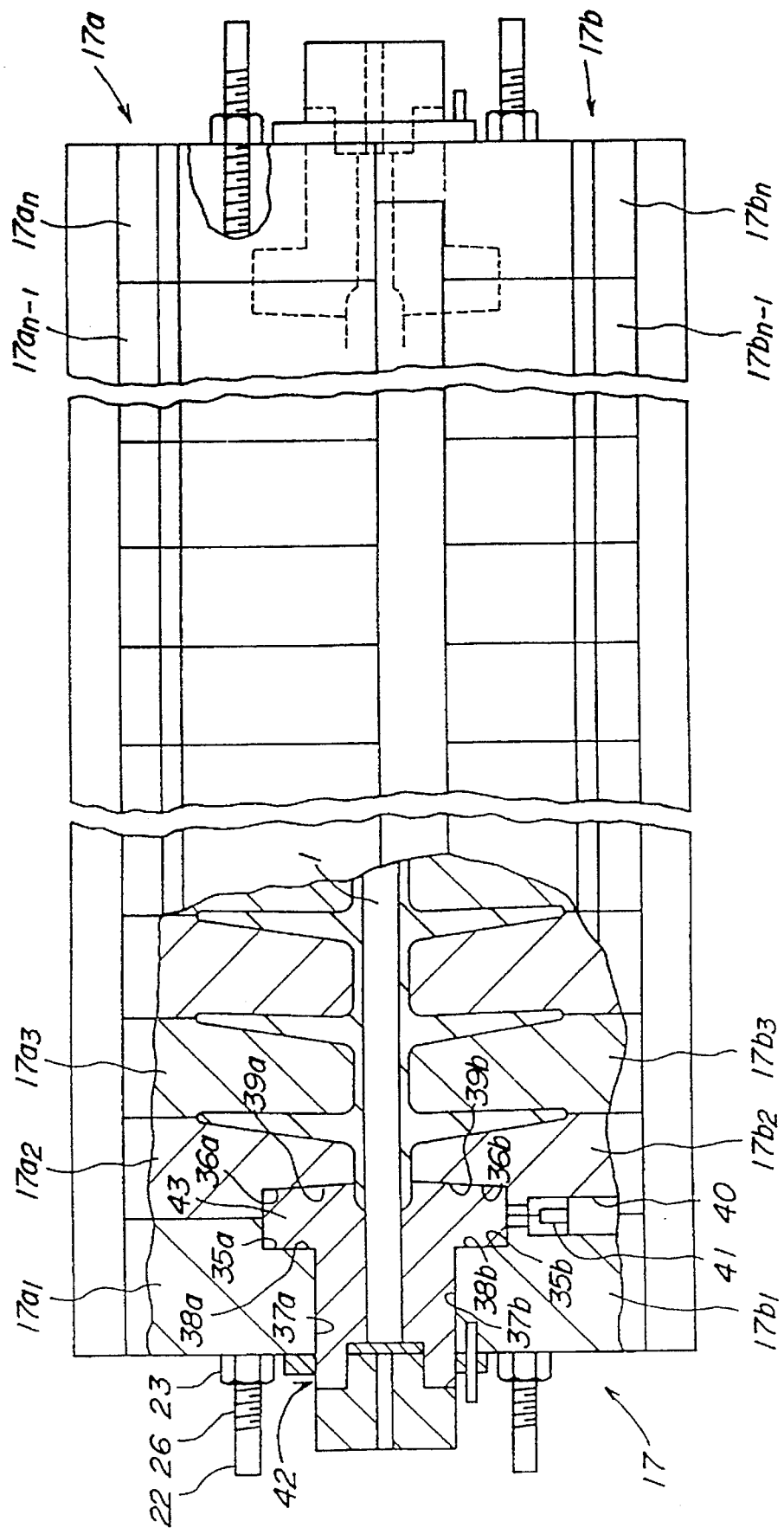
FIG. 17 is a partial sectional view for illustrating a variation of the method and apparatus for producing the composite insulator according to the second aspect of the present invention.
Figure 18:
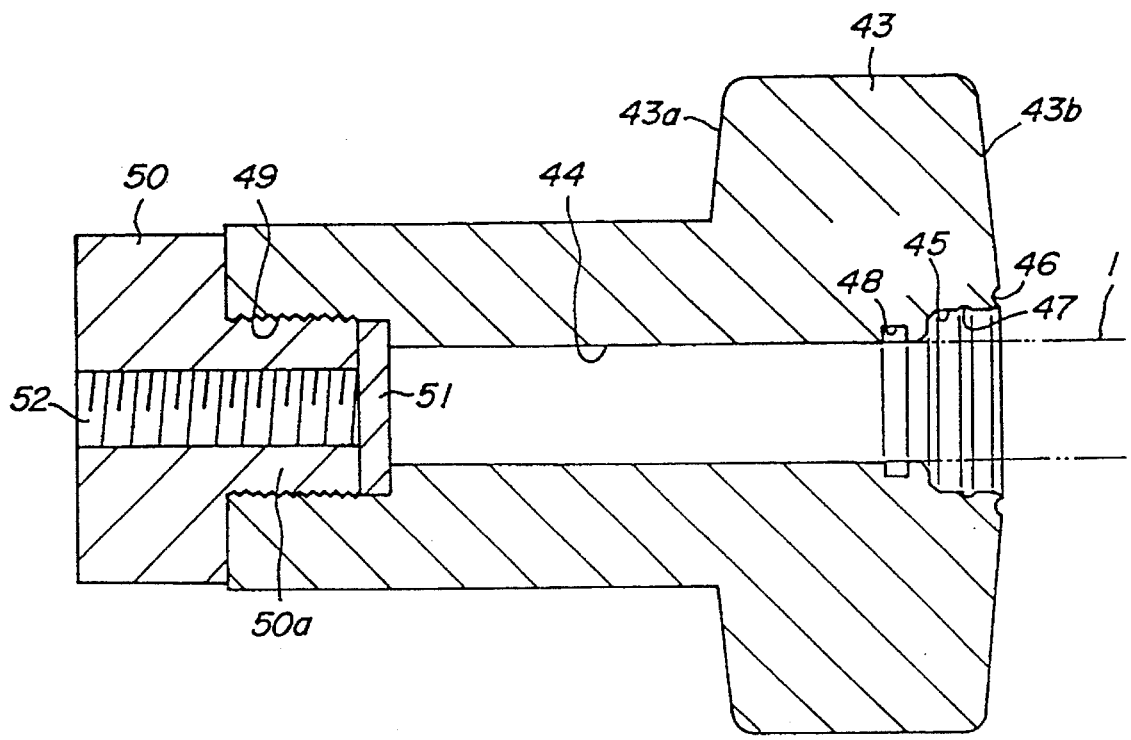
FIG. 18 is a sectional view for illustrating an end cap as a locating member to be used in FIG. 17.
Figure 19:
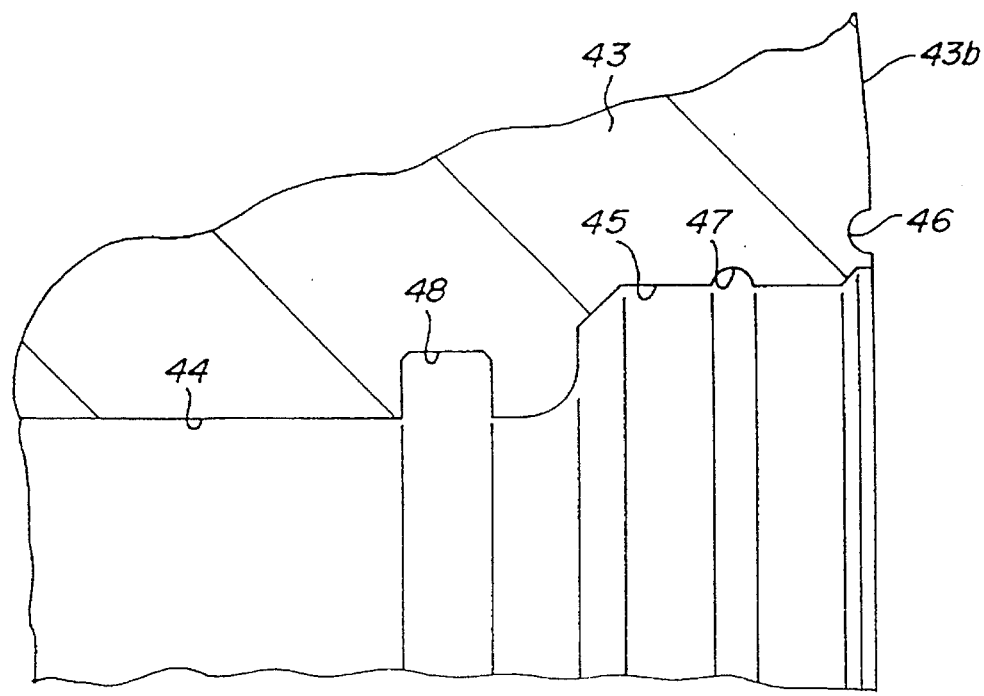
FIG. 19 is a sectional view for illustrating an end portion of the end cap in FIG. 18 near a recess portion for the formation of an end portion of a sheath of an insulator in an enlarged scale.

FIG. 17 through FIG. 19 illustrate another embodiment of the second aspect of the present invention. In FIGS. 17 through 19, the same or similar reference numerals as in FIGS. 16(a) and 16(b) are given to same or similar constituent parts as in FIGS. 16(a) and 16(b). In the embodiments in FIGS. 17 through 19, the upper mold unit 17a is constituted by molding segments $17a_1$, ... $17a_n$ piled and tightened one upon another, whereas the lower mold unit 17b is constituted by molding segments $17b_1$, ... $17b_n$. The adjacent segments $17a_1$, $17a_2$; $17a_{n-1}$, $17a_n$ of the upper mold unit 17a and the adjacent segments $17b_1$, $17b_2$; $17b_{n-1}$, $17b_n$ of the lower mold unit 17b which are all located at the opposite end portions of the mold. The other remaining intermediate molding segments $17a_3$, ... $17a_{n-2}$, and $17b_3$, ... $17b_{n-2}$ all have substantially the same shape.

The molding segments of the upper and lower mold units are tightened by substantially the same construction as that in FIG. 16(a). Therefore, detailed explanation is omitted.

A molding surface is defined by the upper mold unit 17a and the lower mold unit 17b, and has a shape corresponding to a housing 2 of an insulator. The housing is formed inside the molding cavity around the outer periphery of the core 1.

A semi-circular receiving section 35a, 35b is formed in a side face of each of the upper molding segment $17a_1$, $17a_n$ and the lower molding segment $17b_1$, $17b_n$ on each of the opposite ends of the mold. A semi-circular receiving section 36a, 36b is formed in a side face of each of the upper molding segment $17a_2$, $17a_{n-1}$ and the lower molding segment $17b_2$, $17b_{n-1}$ adjacent to the upper and lower molding segments $17a_1$, $17a_n$, $17b_1$, $17b_n$, respectively, while being opposed to the receiving sections 35a, 35b. Further, a semi-circular recess 37a, 37b is formed in a central portion of each of the upper molding segment $17a_1$ and the lower molding segment $17b_1$, and communicate the receiving sections 35a, 35b. Inclined surfaces 38a and 38b are formed at bottoms of the receiving sections 35a and 35b as viewed in the axial direction of the mold, respectively. Inclined surfaces 39a, 39b are formed at bottoms of the receiving sections 36a, 36b, respectively. The surfaces 38a, 38b are inclined axially inwardly in a radially outward direction, while the surfaces 39a, 39b are inclined axially outwardly in the radially outward direction. A hole 28 is defined between the lower molding segments $17b_1$ and $17b_2$ as shown in FIG. 17, and an ejector pin 41 is movably fitted in the hole 28.

As shown in FIG. 17, an end cap 42 is fitted, as a locating member or means, to each of opposite ends of the core 1. The end cap 42 functions to locate the core at an appropriate location inside the mold during the compression molding. The end cap has such an outer configuration as capable of being received in the receiving sections 35a, 35b, 36a, 36b and the recessed portions 37a, 37b.

As illustrated in FIGS. 18 and 19, the end cap 40 has circular section, and includes a guide 43 having an outer diameter greater than that of the remainder. Opposite surfaces 43a and 43b of the guide 41 are so inclined that the inclined surfaces 43a and 43b are intimately fit to those 38a, 38b and 39a, 39b of the molding segments $17a_1$, $17a_2$, $17b_1$, $17b_2$. That is, the surface 43a is inclined axially inwardly in a radially outward direction, while the surface 43b is inclined axially outwardly in the radially outward direction. A gripping hole 44 is bored in a central portion of the end cap 42. The preliminarily molded body is set between the upper and lower mold units in the state that the end cap 42 is fitted to the core at each of the opposite ends such that the end portion of the core is inserted into the gripping hole.

As shown in FIGS. 17 and 18, a larger diameter portion 45 is formed in the gripping hole 44 on a core-inserting side. This larger diameter portion 45 is to form an end portion of the housing 2. An annular groove 46 is formed on the inclined surface 43b of the guide 43 near the larger diameter portion 45. This annular groove 46 is to form a projection as shown at 5 in FIG. 3(b). Annular groove 47 is formed on the inner peripheral surface of the larger diameter portion 45, and is to form a projection as shown at 4 in FIG. 3(b). Further, an annular groove 48 is formed around the inner peripheral surface of the gripping hole 44 axially inside the annular groove 47. The groove 48 functions to catch the rubber leaking from the larger diameter portion 45 and to prevent the rubber from flowing axially outward from the groove 48 during molding the housing 2.

A threaded hole 49, an end portion 50, a small diameter portion 50a, a shim 51 and a screw bolt 52 have the same construction as that in FIG. 16.

Next, the insulator-producing process according to the second aspect of the present invention will be explained below.

As shown in FIG. 4, first a preliminarily molding step is carried out, in which an extruder 10 shown in FIG. 5 is used. A preliminarily molded body is obtained from a raw rubber material R as mentioned before in connection with FIGS. 5 and 6. A coating step is carried out similarly as described in connection with FIG. 4 before the preliminarily molding step.

Then, as understood in FIGS. 16(a), 17 and 21, the end cap 40 is fitted as the locating member at each of the end portions of the core 1 of the preliminarily molded body 15.

Figure 20:
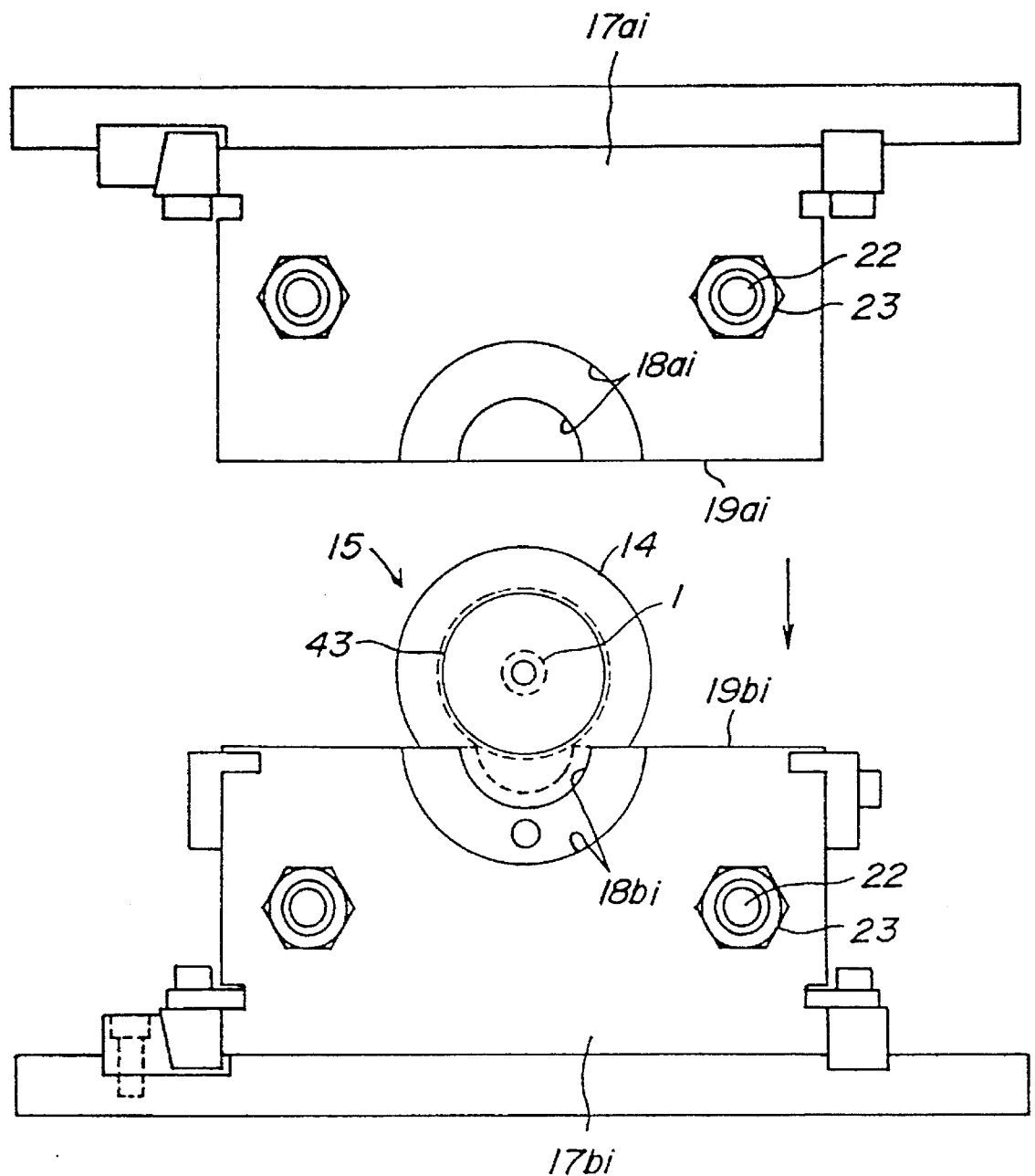
FIG. 20 is a side view for illustrating a state in which a preliminarily molded body for an insulator is set in an opened mold.

Thereafter, as shown in FIGS. 20 and 21, the preliminarily molded body 15 is set on the lower mold unit 17b as the stationary mold unit in the state that the upper mold unit 17a as a movable molded unit is opened relative to the lower mold unit 17b. Since the outer diameter of the rubber layer 14 of the preliminarily molded body 15 is greater than that of the diameter of the molding face to constitute the sheath portion, each of the end caps 42 is floated without being received in the receiving sections 35a, 36a and 35b, 36b.

The upper and lower mold units 17a and 17b are heated to a given temperature by an appropriate heater not shown, and the upper mold unit 17a is lowered to close the mold 17. At that time, even if the preliminarily molded body 15 is slightly positionally deviated from the core 1, the inclined faces 43a and 43b of the guide 43 contact those 38a, 38b, 39a, 39b of the receiving sections 35a, 35b, 36a, 36b, as the upper mold unit 17a is closed to the lower mold unit 17b. Thereby, the core 1 is located in a given central location of the molding face by the guiding action of the inclined faces.

As shown in FIGS. 16(a) and 17, the rubber layer 14 of the preliminarily molded body 15 is compression molded into a given shape by the molding face constituted by the mold units 17a and 17b when the upper mold unit 17a is closed to the inner mold 17b. Since the volume of the rubber layer 14 of the preliminarily molded body 15 is greater than that of the molding cavity defined by the molding face, the rubber of the rubber layer 14 fills the enter cavity defined by the molding face when the rubber layer 14 is compression molded between the upper and lower mold units 17a and 17b to expel air inside the cavity and form the sheath portion 2a and the shade portions 2b.

Furthermore, an end portion of the sheath 2a is formed by the larger diameter portion 48 of the end cap 44, and the projections 4 and 5 (FIG. 3b) are formed by the annular grooves 45 and 46, respectively. As mentioned before, even if the core axially expands through thermal expansion upon molding and the end of the core contacts or is pressed against the shim 47, the core 1 will not be damaged, because the shim 47 is made of a fluorine resin softer than the FRP.

An excess rubber portion is pushed out from the cavity defined by the molding face to the parting faces 19a and 19b of the upper and lower molds 10 and 11, respectively, thereby forming a burr around the molded housing. Simultaneously, excess rubber is also caught inside the groove 48, so that the rubber is prevented from leaking outside along the core 1. The heating temperature, i.e., the vulcanizing temperature on molding is ordinarily set at 150°–180° C., and the heating time is ordinarily set at around 10 minutes. Between the sheath 2a and the core 1 is formed a boundary having electrically high reliability through bonding under vulcanization.

After the compression molding, the mold unit 17a is raised from the lower mold unit 17b to open the mold, and the ejector pin 41 inside the receiving hole 40 defined between the lower molding segments 17b$_1$ and 17b$_2$ is lifted to push up the end cap 42. By so doing, the molded insulator is released from the mold. Further, the end caps are removed from the cores 1, and a burr and the rubber caught in the groove 48 are finally removed. As mentioned before, the burr can be easily removed by scissors or a knife. The annular groove 48 is so designed as to enable the rubber caught therein to be removed by hand without using scissors. Since no adhesive is coated on a portion of the core corresponding to the groove 48, the rubber can be easily removed by hand.

As mentioned above, according to the producing process and apparatus in the second aspect of the present invention, since the insulator with the housing 2 is produced by using the locating end caps 42, the core can be aligned with the center of the molding face upon molding even if the core is slightly positionally deviated from the center of the preliminarily molded body 15. Therefore, it is not feared that the core 1 is broken between the mold units 17a and 27b of the mold 17. Therefore, the yield for the products can be enhanced.

Furthermore, since the housing 2 is formed by compression molding, it is unnecessary to pour rubber into the molding face. Therefore, a pot, a gate unit, etc. required by the conventional transfer molding process are omitted, which simplifies the construction of the insulator-molding device.

Further, since the pressure is applied to the core from all directions because of the compression molding, the core is not bent. Thus, even the long insulator housing, which may be used for transmission of high voltage electric power, can be integrally and easily produced. Further, since the core 1 is not bent, supports as required in the transfer molding process are unnecessary, which also simplifies the construction of the molding device.

In the second aspect of the present invention, the countermeasure or countermeasures illustrated in connection with FIGS. 14(a) and 14(b) and/or FIGS. 15(a) and 15(b) may be employed so long as such will not damage the merit obtained by this second aspect of the invention.

In the following, the third aspect of the present invention will be explained with reference to FIGS. 22 through 27.

Referring to an embodiment illustrated in FIGS. 22 through 25 in which the upper and lower mold units are constituted by a plurality of molding segments as in FIGS. 16(a) and 17(a), two rows of grooves 24a and 24b each having a V-shaped section are formed on parting faces 19a and 19b of intermediate segments 17a$_i$ and 17b$_i$ (i=2~n-1) of the upper and lower molds 17a and 17b, respectively, along an outer contour line of a molding face. Excess rubber coming out into a clearance between the parting faces 19a and 19b on molding is caught by the grooves 24a and 24b. A burr formed around a housing 2 can be easily removed by grasping rigid rubber portions formed within these grooves.

A rubber-escaping groove is formed at a parting face of at least one of the stationary mold unit and the movable mold unit of the mold between the molding face of the cavity of the mold and the outer periphery of the mold. The rubber-escaping groove preferably includes at least two grooves in which the groove located outwardly is deeper than that located inwardly of the mold.

Figure 24:
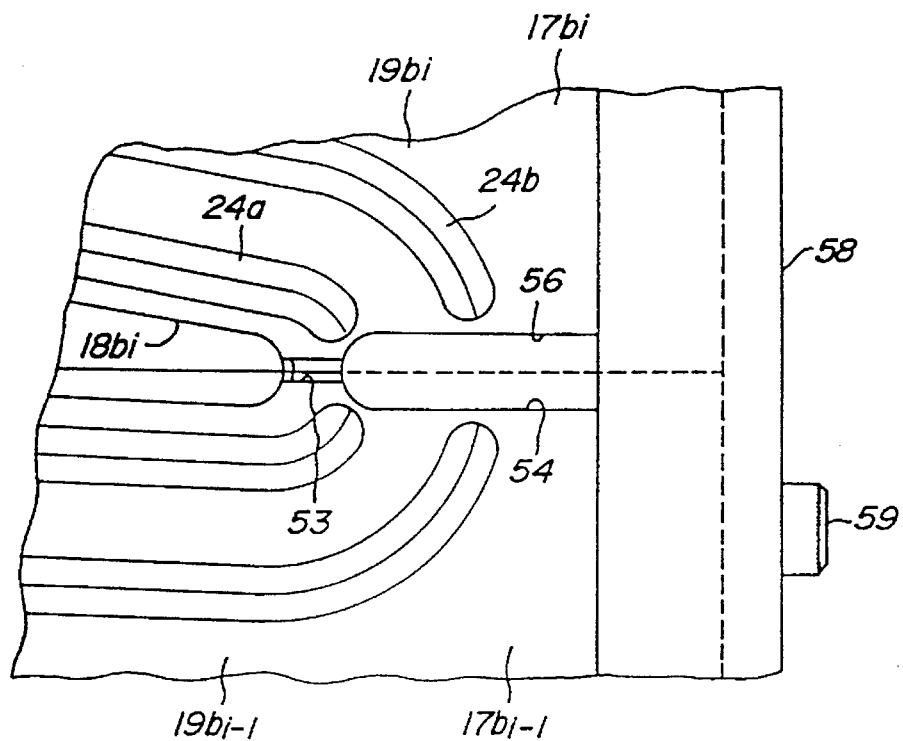
FIG. 24 is a plane view of the lower segment in FIG. 23.

In the illustrated embodiment in FIGS. 22 to 24, between a portion of the molding face and the outer side of the mold are formed three grooves, that is, an innermost groove 53, an intermediate groove 54, and an outermost groove 55 of which depths are increased in this order. The innermost groove 53 is opened to the pressing face, and the outermost groove 55 is opened to the outer side of the mold. An exchangeable key 56 is fitted in the intermediate groove 54, and is pressed against a vertical wall 57 between the grooves 53 and 54 by means of an end portion of an angular pressing plate 58 fitted in the groove 55, while the other end portion is in turn fixed to the lower molding segment by a cap bolt 59. The key is prevented from slipping out from the groove 54 by the pressing plate 58 and the cap bolt 59. The pressing plate 58 may be commonly used for any one of the lower molding segment 17b$_1$, . . . 17b$_n$, and fixed to the outer side faces thereof by means of the end bolts 59. A gap 80 is defined as a rubber-escaping groove between the upper face of the key 56 and the parting face 19a of the upper molding segment 17a$_i$ including the groove 53 and a gap between the angular plate 58 and the parting face 19. This gap 80 may be adjusted by selectively using an appropriate key 56 having a given thickness.

According to the mold constructed above, a part of excess rubber expanded by heating escapes outside the molding face from the tip of the groove 53 opened to the molding face through the rubber-escaping groove 73. Therefore, pressure in the cavity inside the molding face is kept at an appropriate level.

When the rubber flows into the escaping gap 80, the rubber inside the gap 80 is vulcanized earlier by heating than in the cavity inside the molding face, because the interior of the gap is far smaller than the cavity. Therefore, the gap 80 is closed with cured rubber at an early stage, so that the cavity inside the molding space is sealed. Consequently, the pressure in the cavity inside the molding face can be kept at an appropriate level. Thus, the housing can be formed, accurately following the shape of the molding face.

In addition, according to the embodiment, since the rubber-escaping groove is opened at the outermost side portion of the molding face where the raw material is most difficult to reach, the rubber composition is smoothly and assuredly led to the outermost side of the molding face and then to the rubber-escaping groove. Therefore, the housing 2 can be prevented from being drawn in a depressed form, so that cracking is prevented from occurring at a bottom portion of the drawn portion of the housing. The rubber flown out to the gap 80 is cut off after the housing 2 is formed.

Figure 25:
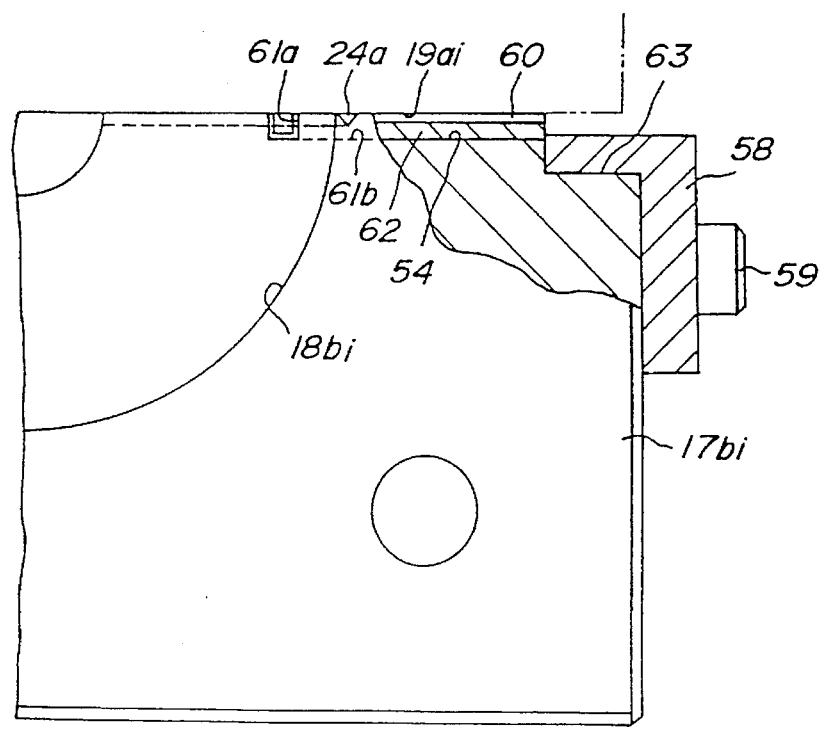
FIG. 25 is a partial broken view for illustrating a part of a lower molding segment according to a modification of the third aspect of the present invention.
Figure 26:
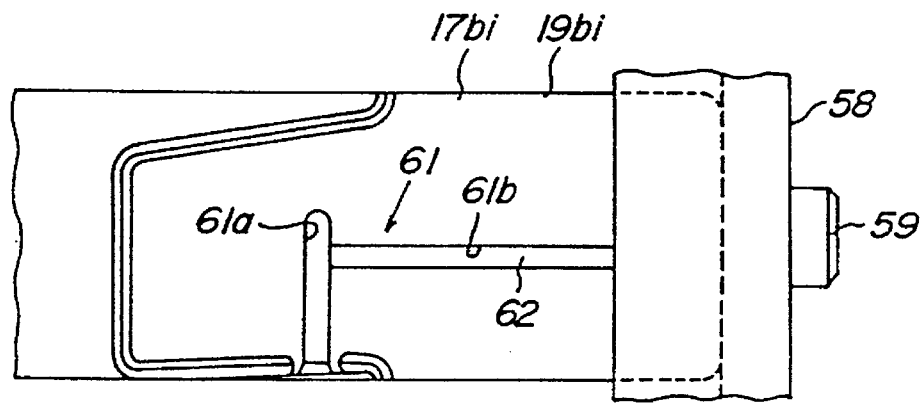
FIG. 26 is a partial sectional plane view for illustrating the lower molding segment in FIG. 25.
Figure 27:
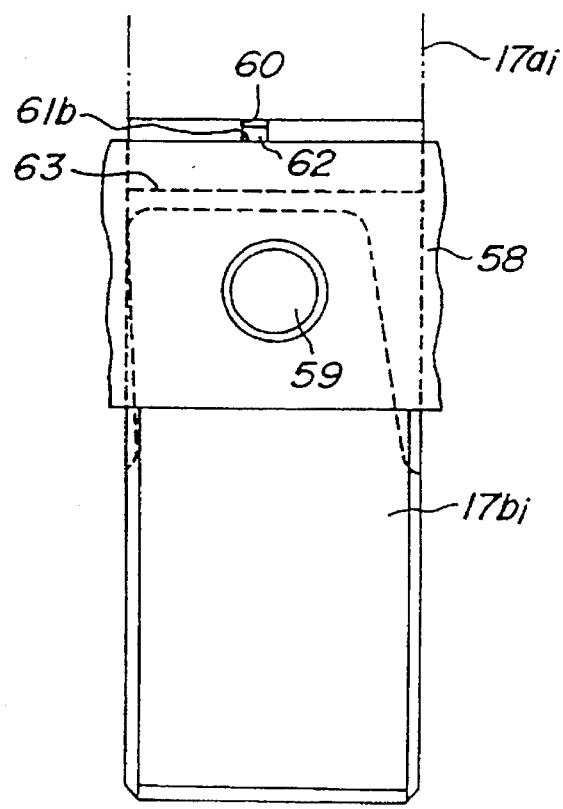
FIG. 27 is a side view for illustrating the lower molding segment in FIG. 25.

Next, another embodiment of the third aspect of the present invention will be explained below with reference to FIGS. 25 through 27.

A rubber-escaping groove 61 is formed in a bent shape at a parting face $19b_i$ of a low molding segment $17b_i$ such that an inner end of the rubber-escaping groove 61 is opened to the molding face corresponding to a rear surface of a shade portion and an outer end thereof is opened outside the molding segment $17b_i$. The rubber-escaping element includes an inner groove 61a and an outer groove 61b. The inner groove 61a is opened to the molding face, and extends in an axial direction of the mold unit 17. The outer groove 61b is joined to the inner groove 61a at right angles, and opened outside the molding segment $17b_i$. The grooves 61a and 61b have almost the same depth in this embodiment but may have different depths. A key 62 is detachably fitted into the outer groove 61b, and a gap 60 is formed as a rubber-escaping groove between the upper face of the key 62 and the parting face $19a_i$ of the upper molding segment $19a_i$, including the inner groove 61a. An appropriate key 62 may be selectively used depending upon the height of the gap 60 desired.

An angular plate 58 and a cap bolt 59 are used for the same purpose as in the embodiment of FIGS. 22–24. A depression 63 is formed to receive an end portion of the angular plate 58.

A V-shaped groove 24a is formed at a parting face $19b_i$ of the lower molding segment $17b_i$ along the outer contour of the molding face.

According to this molding device, a part of excess rubber expanded by heating escapes outside from the molding face up to the gap 60 through the inner groove 61a. Therefore, the pressure inside a cavity within the molding face can be kept at an appropriate level so that a housing having a shape accurately in conformity with the molding face can be molded. Furthermore, the rubber can be prevented from being drawn at locations corresponding to the parting faces $19a_i$ and $19b_i$ at the shade portion 2b. In addition, since the escaping groove 60 is continued to the rear face of the shade portion 2b, a trace of the escaping groove 60 may be retained at the rear face of the shade portion only to make the appearance of the insulator good.

The second and third aspects of the present invention are not limited to the above-mentioned embodiments, and the following may be employed therefor.
(1) The shape of the guides 28, 43 as well as those of the receiving recesses are designed to be substantially cylindrical, but may be designed to be spherical.
(2) The rubber-escaping groove may be formed directly in the lower molding segment without using a key, different from the embodiments in FIGS. 22 through 27. This makes the provision of the pressing member unnecessary.
(3) Instead of the upper and lower mold units each being constituted by a plurality of the molding segments, the mold units may be of an integral structure.
(4) The rubber-escaping groove is formed on each of the upper molding segments or on each of the upper and lower molding segments.
(5) The V-shaped groove may be formed on either the upper molding segment or the lower molding segment.

The present invention hereinbefore explained can be widely applied to the composite insulators, also called "polymer insulators", having the structure in which a housing made of an electrically insulating material such as EPDM rubber is provided around the outer periphery of a rod-shaped insulating supporting member made of, for example, a fiber-reinforced plastics.

We claim:

1. A process for producing an insulator, comprising the steps of:
   (A) preliminarily shaping a rubber layer of a raw rubber composition around an outer periphery of a core by extrusion molding to obtain a preliminarily molded body;
   (B) placing said preliminarily molded body between at least two molded units of a mold;
   (C) simultaneously forming from said raw rubber composition of the rubber layer a sheath portion on said core and at least one shade portion extending from the sheath portion, by compression molding said preliminarily molded body between said at least two mold units to form a shaped body;
   (D) curing the shaped body.

2. The producing process set forth in claim 1, wherein before the step (B), the rubber layer is removed from the preliminarily molded body at opposite end portions thereof.

3. The producing process set forth in claim 1, wherein a long preliminarily molded body is formed and cut into a plurality of preliminarily molded bodies to be subjected to the steps (B) to (D).

4. The producing process set forth in claim 1, wherein when the rubber layer is formed around the outer periphery of the core, and the rubber layer is bonded to the outer periphery of the core.

5. The producing process set forth in claim 1, wherein before said preliminary shaping step, the core is washed and dried, and an adhesive is applied to an outer periphery of the core.

6. The producing process set forth in claim 1, wherein a burr formed on an outer surface of the insulator is removed.

7. The producing process set forth in claim 1, wherein a volume of the rubber layer of the preliminarily molded body is greater than a volume of a cavity of the mold defined between the mold units.

8. The producing process set forth in claim 1, wherein the preliminarily molded body is placed between the mold units, and an additional rubber layer is arranged between the mold units on respective opposite sides of the preliminarily molded body, followed by the compression molding and the curing.

9. The producing process set forth in claim 1, wherein before the step (B), a locating member having a locating face is fitted to the core for locating the core relative to the mold, and the preliminarily molded body is compression molded while the core is positioned by contact between the locating face of the locating member and a corresponding locating face provided in or on the mold.

10. The producing process set forth in claim 1, wherein in the step (C), an internal pressure inside the cavity of the mold is regulated by means of a rubber-escaping groove which extends to the cavity of the mold and is provided at a parting interface between the mold units.

11. A process for producing an insulator, comprising the steps of:
   (A) washing and drying a core, and coating said core with an adhesive;

(B) preliminarily shaping a rubbery layer around an outer periphery of said core by extrusion molding to obtain a preliminarily molded body;

(C) cutting the preliminarily molded body to a given dimension;

(D) placing said preliminarily molded body between at least two mold units of a mold;

(E) simultaneously forming from said rubbery layer a sheath portion on said core and a plurality of shade portions extending from the sheath portion, by compression molding said preliminarily molded body between said at least two mold units to form a shaped body;

(F) curing the shaped body; and (G) removing a burr formed on an outer peripheral wall of said insulator.

12. An apparatus for producing an insulator, comprising:

(A) a preliminary molding means for preliminarily shaping a rubbery layer of a raw rubber composition around an outer periphery of a core to obtain a preliminarily molded body;

(B) a forming means for forming a compressed molding by compression molding said preliminarily molded body inside a cavity defined between at least two mold units to form simultaneously from the raw rubber composition of the rubbery layer a sheath portion on said core and a plurality of shade portions extending from the sheath portion, wherein a rubber-escaping groove is provided along an interface between the mold units, said rubber-escaping groove extending to the cavity of the mold; and (C) a heater for curing the raw rubber composition of the compressed molding.

13. The producing apparatus set forth in claim 12, wherein at least one of the mold units is provided with at least one groove formed around a periphery of the cavity, along an interface between the mold units.

14. An apparatus for producing an insulator, comprising:

(A) a preliminary molding means for preliminarily shaping a rubbery layer of a raw rubber composition around an outer periphery of a core to obtain a preliminarily molded body;

(B) a forming means for forming a compressed molding by compression molding said preliminarily molded body inside a cavity defined between at least two mold units to form simultaneously from the raw rubber composition of the rubbery layer a sheath portion on said core and a plurality of shade portions extending from the sheath portion, each mold unit comprising a plurality of molding segments plied together and tightened upon each other; and (C) a heater for curing the raw rubber composition of the compressed molding.

15. The producing apparatus set forth in claim 14, wherein at least one of the mold units is provided with at least one groove formed around a periphery of the cavity, along an interface between the mold units.

16. The producing apparatus set forth in claim 14, wherein a rubber-escaping groove is provided along an interface between the mold units, said rubber-escaping groove extending to the cavity of the mold.

* * * * *